United States Patent
Elshafie et al.

(10) Patent No.: US 11,678,356 B2
(45) Date of Patent: Jun. 13, 2023

(54) COLLECTING BUFFERED CSI FROM A UE

(71) Applicant: QUALCOMM Incorporated, San Diego, CA (US)

(72) Inventors: Ahmed Elshafie, San Diego, CA (US); Yi Huang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/445,181

(22) Filed: Aug. 16, 2021

(65) Prior Publication Data

US 2023/0045947 A1    Feb. 16, 2023

(51) Int. Cl.
| | |
|---|---|
| *H04W 72/54* | (2023.01) |
| *H04L 1/00* | (2006.01) |
| *H04L 1/1607* | (2023.01) |
| *H04L 1/1812* | (2023.01) |
| *H04L 1/1867* | (2023.01) |
| *H04L 1/20* | (2006.01) |
| *H04W 72/20* | (2023.01) |

(52) U.S. Cl.
CPC ........... *H04W 72/54* (2023.01); *H04L 1/0003* (2013.01); *H04L 1/0026* (2013.01); *H04L 1/1614* (2013.01); *H04L 1/1819* (2013.01); *H04L 1/1896* (2013.01); *H04L 1/203* (2013.01); *H04W 72/20* (2023.01)

(58) Field of Classification Search
CPC ......... H04W 72/1226; H04W 72/1221; H04W 72/1205; H04W 72/1257; H04W 72/1236; H04W 72/0406; H04W 72/048; H04W 72/08; H04L 1/0003; H04L 1/0002; H04L 1/0023; H04L 1/0027; H04L 1/0026; H04L 1/0031; H04L 1/1628; H04L 1/1671; H04L 1/1621; H04L 1/1896; H04L 1/1816; H04L 1/1812; H04L 1/1819; H04L 1/1869; H04L 1/1893
See application file for complete search history.

(56) References Cited

U.S. PATENT DOCUMENTS

| | | | | |
|---|---|---|---|---|
| 2018/0324797 | A1* | 11/2018 | Hosseini | H04L 5/0057 |
| 2019/0053084 | A1* | 2/2019 | Hosseini | H04L 1/0027 |
| 2019/0215781 | A1* | 7/2019 | Jeon | H04W 52/325 |
| 2020/0092739 | A1* | 3/2020 | Yang | H04L 5/0091 |
| 2020/0169364 | A1* | 5/2020 | Hao | H04L 5/0094 |
| 2020/0383119 | A1* | 12/2020 | Sun | H04B 17/309 |

(Continued)

*Primary Examiner* — Phong La
(74) *Attorney, Agent, or Firm* — Arent Fox LLP

(57) ABSTRACT

Aspects are provided allowing a base station to configure a UE to accumulate CSI over time for downlink data transmissions, and to transfer the accumulated CSI to a base station in a CSI report in response to a CSI report trigger event, thereby improving efficiency in CSI reporting and subsequent transmission reliability. Initially, the base station configures a CSI report trigger event and sends a plurality of data transmissions to a UE. The UE receives the data transmissions and then identifies the CSI report trigger event. Afterwards, the UE sends a CSI report to the base station including a CSI for each of the data transmissions in response to the CSI report trigger event. The base station may then adjust MCS or other parameters for subsequent data transmissions in response to the CSI report.

26 Claims, 17 Drawing Sheets

(56) References Cited

U.S. PATENT DOCUMENTS

| | | | |
|---|---|---|---|
| 2021/0136862 A1* | 5/2021 | He | H04B 7/0408 |
| 2021/0184810 A1* | 6/2021 | Bai | H04L 5/0048 |
| 2021/0376966 A1* | 12/2021 | Sengupta | H04L 27/2607 |
| 2022/0104187 A1* | 3/2022 | Zhou | H04W 72/0446 |
| 2022/0104207 A1* | 3/2022 | Elshafie | H04W 72/042 |
| 2022/0225369 A1* | 7/2022 | Park | H04L 5/0053 |
| 2022/0322358 A1* | 10/2022 | Zhou | H04W 72/14 |

* cited by examiner

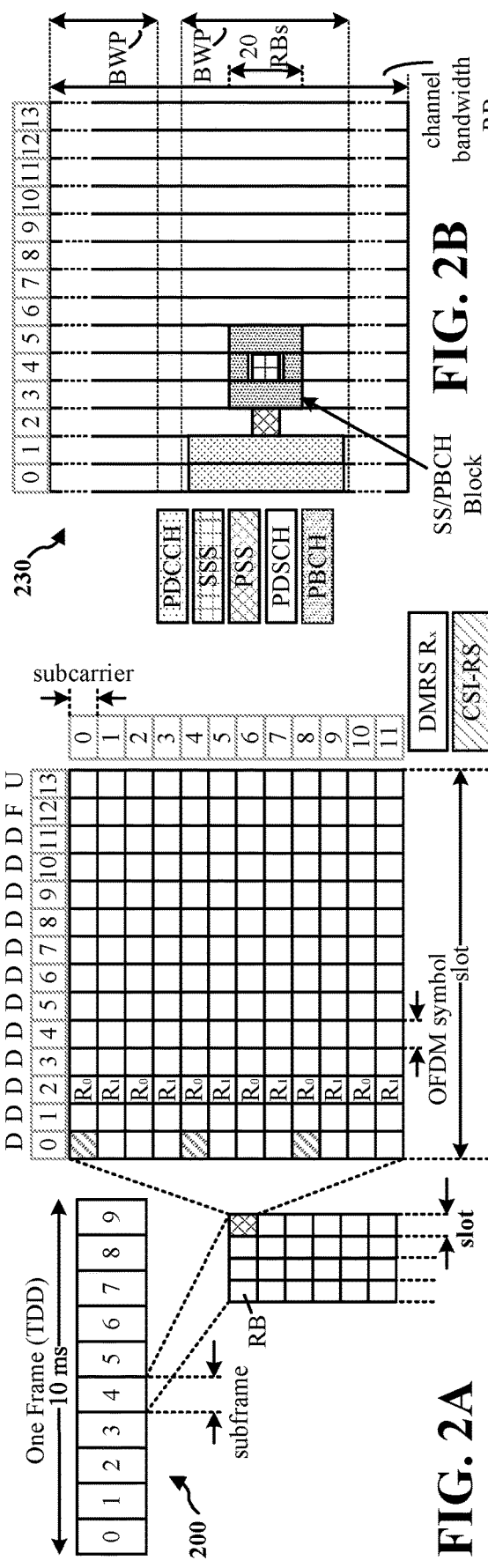
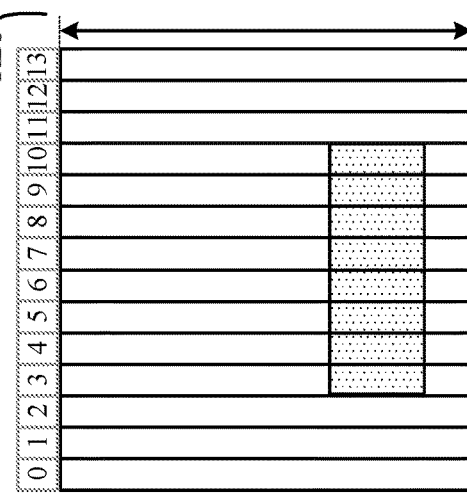
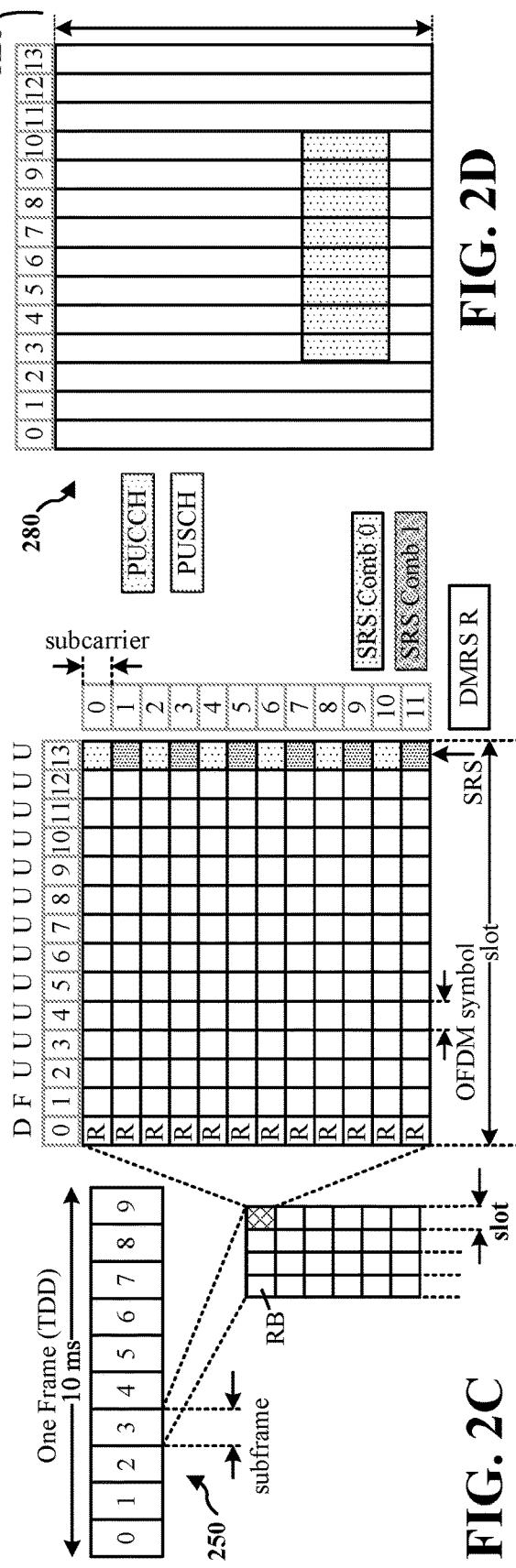
FIG. 2A
FIG. 2B
FIG. 2C
FIG. 2D

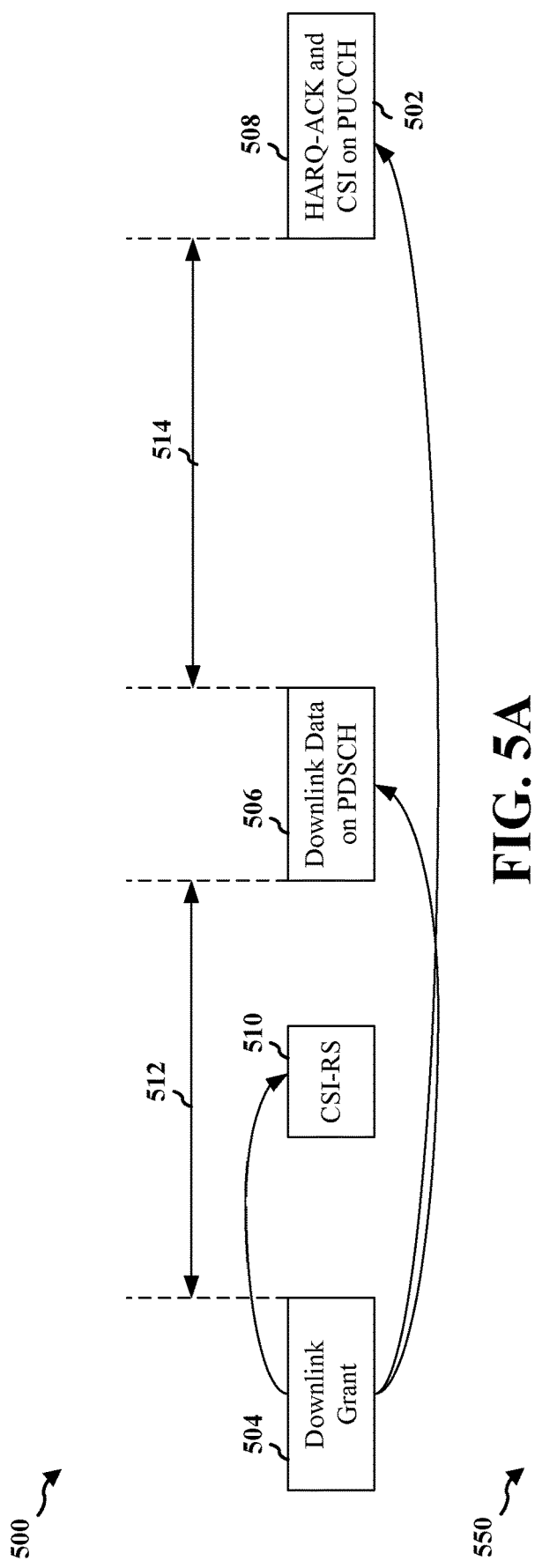
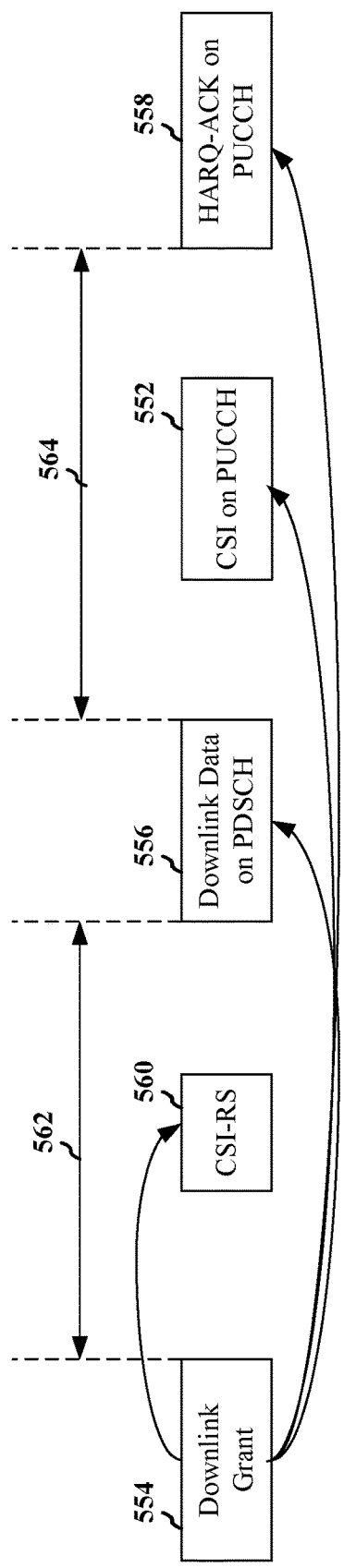
FIG. 5A
FIG. 5B

COLLECTING BUFFERED CSI FROM A UE

BACKGROUND

Technical Field

The present disclosure generally relates to communication systems, and more particularly, to a wireless communication system between a user equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a plurality of data transmissions from a base station; identifies a channel state information (CSI) report trigger event; and sends a CSI report including a CSI for each of the data transmissions in response to the CSI report trigger event.

In an aspect of the disclosure, a method, a computer-readable medium, and an apparatus are provided. The apparatus may be a base station. The base station sends a plurality of data transmissions to a UE; configures a CSI report trigger event; and receives a CSI report including a CSI for each of the data transmissions in response to the CSI report trigger event.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 5A and 5B are diagrams illustrating example transmissions of an aperiodic CSI report in response to a downlink grant.

DETAILED DESCRIPTION

Figure 1:
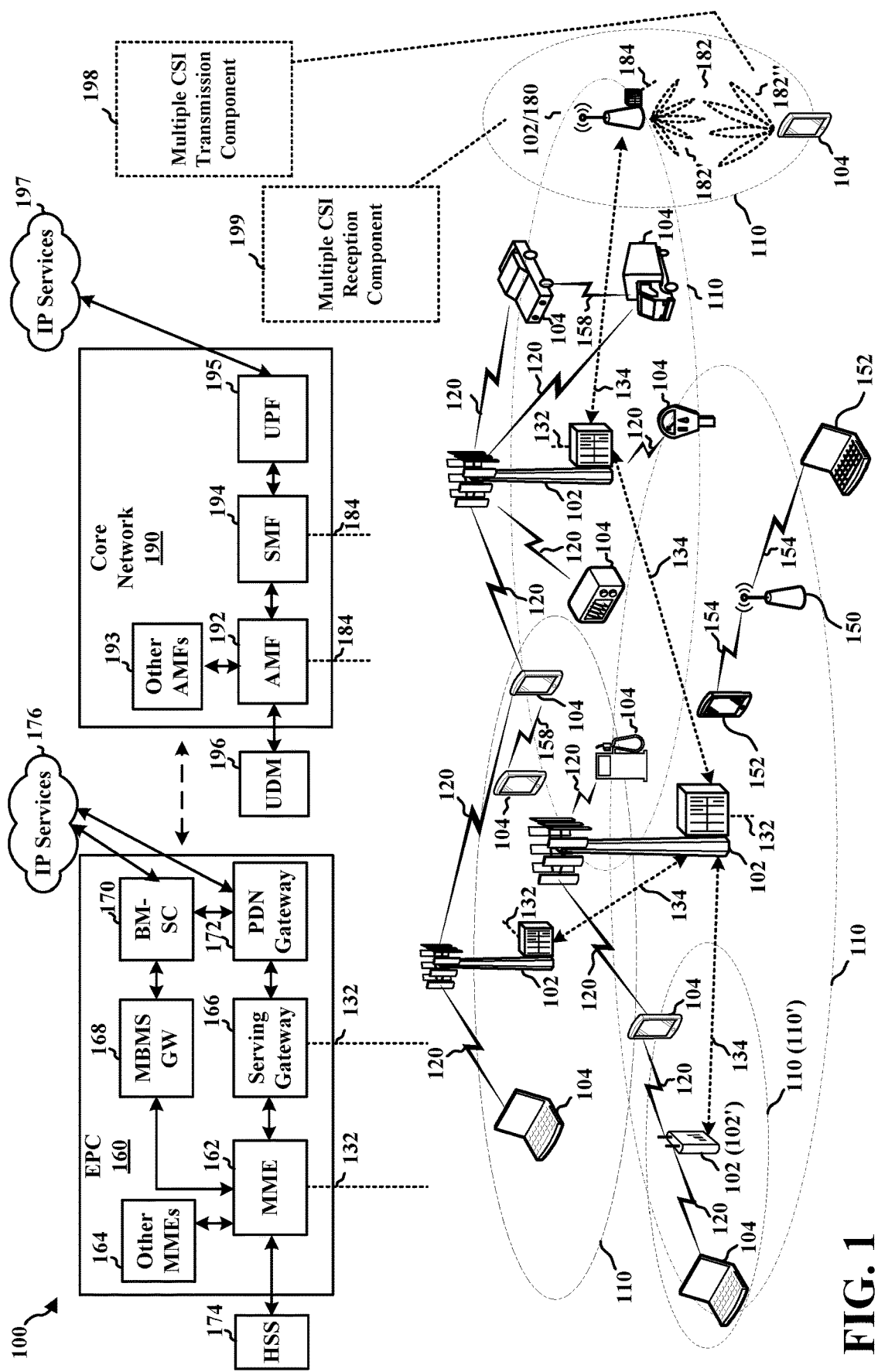
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

When a UE communicates with a base station over a wireless channel, the UE may measure channel quality and report channel quality measurement results to the base station. For example, the base station may transmit one or more channel state information (CSI) reference signals (CSI-RS) to the UE, and the UE may measure a signal-to-noise ratio (SNR) (or signal to noise interference ratio (SINR)) of the channel based on a reference signal received power (RSRP) or received signal strength indicator (RSSI) of the CSI-RS. Here, SNR and SINR are referred to interchangeably, and thus any reference to SNR may be substituted with SINR or vice-versa throughout this disclosure. The UE may also measure SINR or perform other channel quality measurements based on other signals than CSI-RS, such as demodulation reference signals (DMRS) or other signals on a physical downlink shared channel (PDSCH) that may assist the UE in decoding the PDSCH. The UE may then identify CSI based on the measured RSRP/RSSI/SINR and provide a CSI report to the base station including one or more reporting parameters indicating the channel quality measurement results. For example, the UE may report a channel quality indicator (CQI), a precoding matrix indicator (PMI), a rank indicator (RI), a layer indicator (LI), or other types of CSI (e.g. L1-RSRP, etc.) based on the CSI-RS, DMRS, or other PDSCH signals.

The base station may transmit a downlink grant to the UE (e.g. downlink control information (DCI) scheduling a PDSCH transmission) which triggers aperiodic CSI-RS transmissions and CSI feedback. For example, the base station may provide DCI including a CSI trigger field, and the UE may measure CSI and transmit the aperiodic CSI report in response to the DCI. The UE may provide the aperiodic CSI feedback on PUCCH in response to the DCI, as well as HARQ-ACK feedback on PUCCH in response to downlink data scheduled by the DCI. In response to the CSI report, the base station may adjust MCS or other parameters to result in more reliable or faster, subsequent downlink transmissions. Thus, downlink grant-triggered, aperiodic CSI reporting may support reduced latency and increased reliability in communications.

However, when the UE provides such aperiodic CSI to the base station, the UE typically provides the aperiodic CSI in response to an individual downlink data transmission. For example, if the UE receives one or more downlink grants scheduling multiple downlink data transmissions, the UE reports CSI separately for each individual transmission (e.g., one CSI report for each downlink data transmission). Such individual CSI reporting may be inefficiently waste time and resources of the UE or base station.

Accordingly, to improve efficiency in CSI reporting, aspects of the present disclosure allow a UE to accumulate CSI over time for multiple downlink data transmissions (e.g., transport blocks) scheduled by one or more downlink grants, for example, in a CSI buffer, and to transfer the accumulated CSI to the base station in a single CSI report in response to a CSI report trigger event. For instance, to improve transmission performance, especially for ultra-reliable low latency communication (URLLC) or other high reliability services, the base station may indicate to the UE to send a CSI report including a list of previous, unexpired and unshared CSI. For example, the base station may provide a downlink grant (e.g., DCI) optionally triggering CSI-RS and scheduling a PDSCH transmission or transport block, and the UE may obtain the CSI based on the CSI-RS (e.g., measured from RSRP of CSI-RS) or based on PDSCH decoding (e.g., measured from DMRS in PDSCH). The UE may similarly obtain CSI from multiple PDSCH transmissions or CSI-RS, and store each CSI in a buffer. When the UE identifies a CSI report trigger event, the UE may report the multiple, stored CSI in response to the most recent PDSCH transmission.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a multiple CSI transmission component 198 that is configured to receive a plurality of data transmissions from a base station; identifying a CSI report trigger event; and send a CSI report including a CSI for each of the data transmissions in response to the CSI report trigger event.

Referring again to FIG. 1, in certain aspects, the base station 180 include a multiple CSI reception component 199 that is configured to send a plurality of data transmissions to a UE; configure a CSI report trigger event; and receive a CSI report including a CSI for each of the data transmissions in response to the CSI report trigger event.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
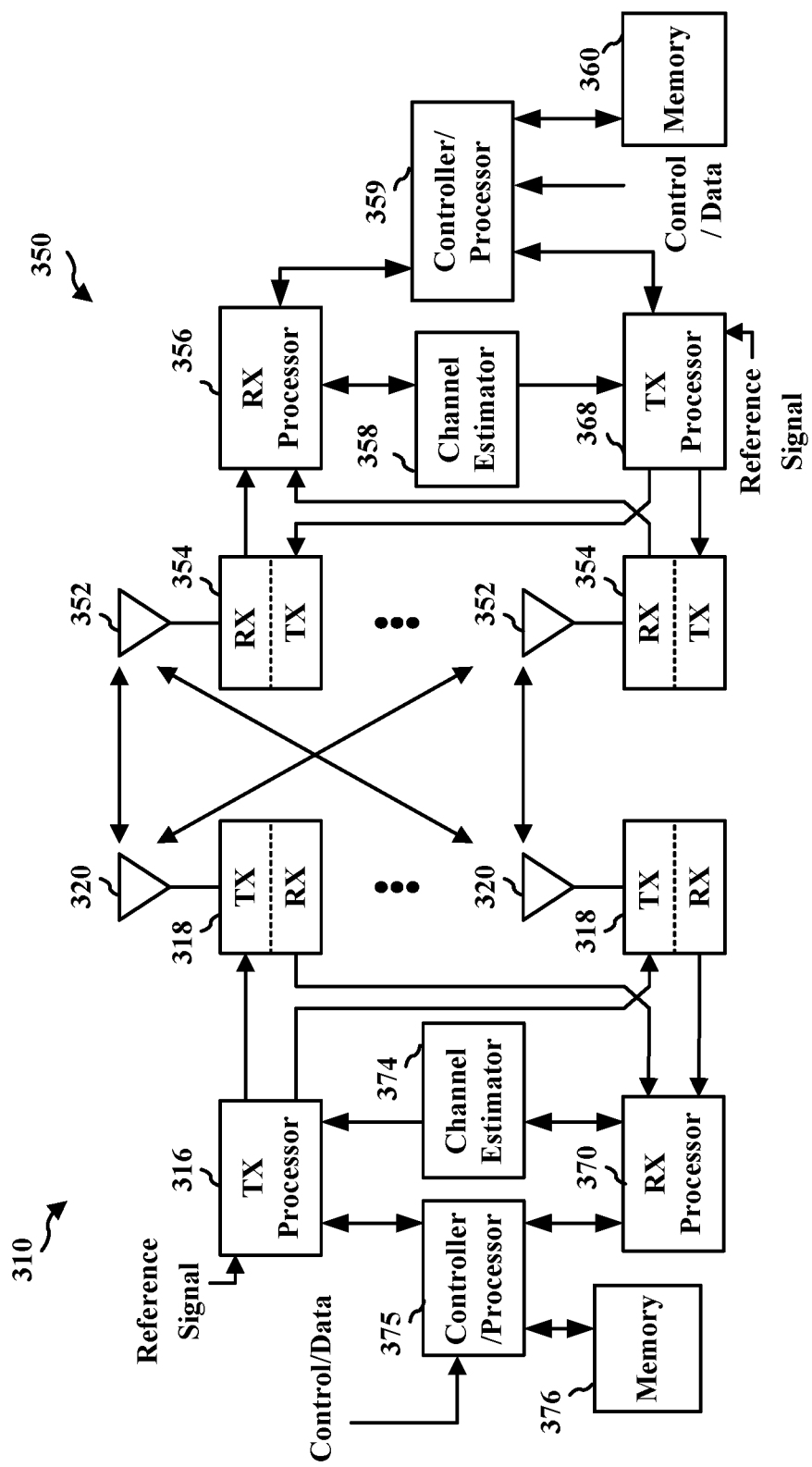
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with multiple CSI transmission component 198 of FIG. 1.

At least one of the TX processor 316, the RX processor 370, and the controller/processor 375 may be configured to perform aspects in connection with multiple CSI reception component 199 of FIG. 1.

When a UE communicates with a base station over a wireless channel, the UE may measure channel quality and report channel quality measurement results to the base station. For example, the base station may transmit one or more CSI-RS to the UE, and the UE may measure a SNR or SINR of the channel based on RSRP or RSSI of the CSI-RS.

Here, SNR and SINR are referred to interchangeably, and thus any reference to SNR may be substituted with SINR or vice-versa throughout this disclosure. The UE may also measure SINR or perform other channel quality measurements based on other signals than CSI-RS, such as DMRS or other signals on a PDSCH that may assist the UE in decoding the PDSCH. The UE may then identify CSI based on the measured RSRP/RSSI/SINR and provide a CSI report to the base station including one or more reporting parameters indicating the channel quality measurement results. For example, the UE may report a CQI, a PMI, a RI, a LI, or other types of CSI (e.g. L1-RSRP, etc.) based on the CSI-RS, DMRS, or other PDSCH signals.

The base station may schedule the UE to provide CSI reports to the base station periodically, semi-persistently, or aperiodically. For example, the base station may transmit a RRC configuration to the UE scheduling periodic CSI-RS transmissions and CSI feedback on PUCCH. In another example, the base station may transmit to the UE a MAC-CE or DCI which triggers semi-persistently scheduled CSI-RS transmissions and CSI feedback. The UE may provide the semi-persistent CSI feedback on PUCCH in response to a MAC-CE or on PUSCH in response to a DCI. In a further example, the base station may transmit an uplink grant to the UE (e.g. a DCI scheduling a PUSCH transmission) which triggers aperiodic CSI-RS transmissions and CSI feedback. The UE may provide the aperiodic CSI feedback on PUSCH in response to the DCI.

Figure 4:
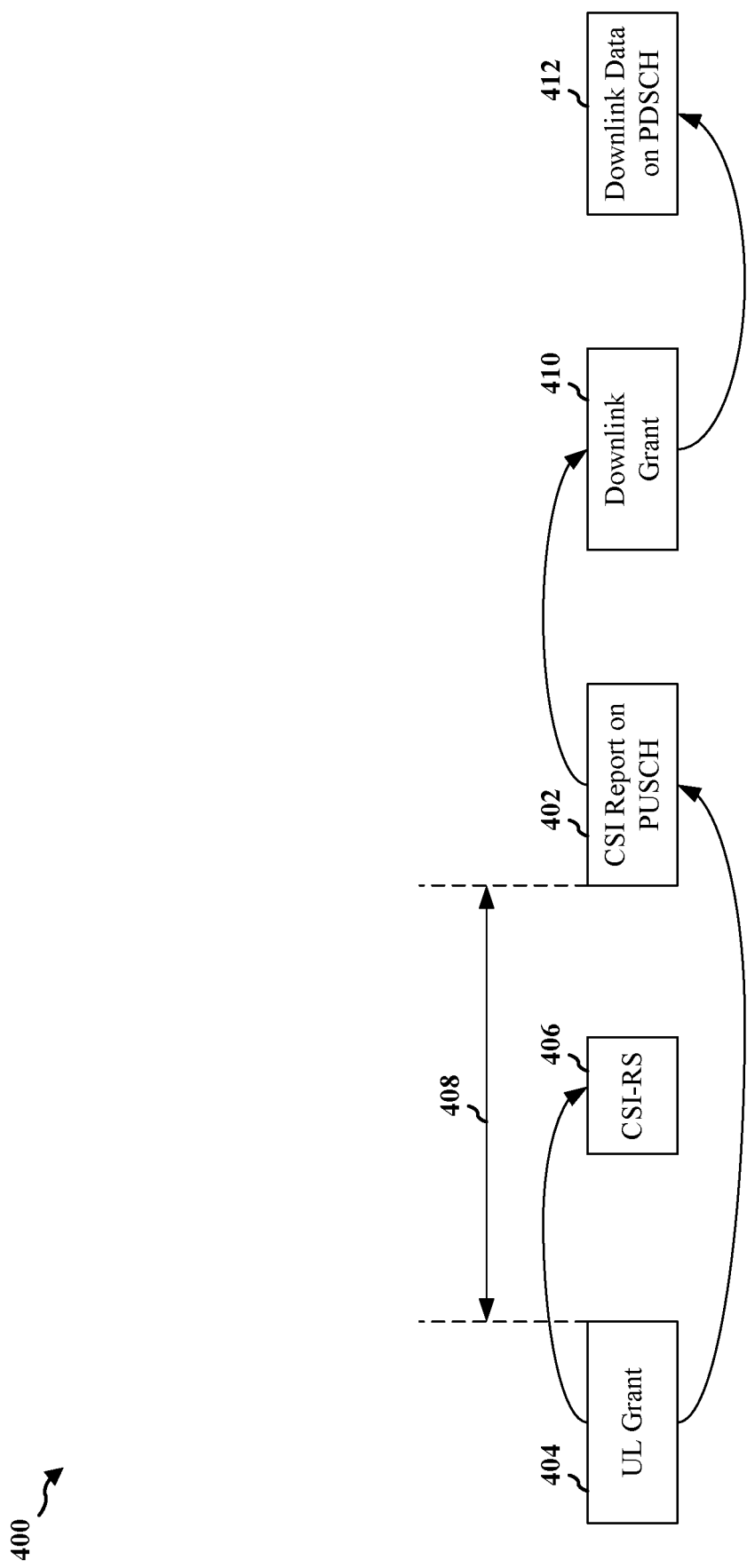
FIG. 4 is a diagram illustrating an example transmission of an aperiodic CSI report in response to an uplink grant.

FIG. 4 illustrates the example 400 where a UE transmits an aperiodic CSI report 402 on PUSCH in response to an uplink grant 404 from a base station. While the following example refers specifically to aperiodic CSI feedback based on CSI-RS, in other examples, the CSI feedback may be aperiodic and based on DMRS or other downlink signals for decoding PDSCH. In the example of FIG. 4, the UE may first receive uplink grant 404 which triggers aperiodic CSI-RS 406 and which schedules the PUSCH transmission including the aperiodic CSI report 402. The uplink grant 404 may also indicate a slot offset index 408 (e.g. K2), which may indicate the slot at which the UE transmits the PUSCH. The UE may measure CSI based on the aperiodic CSI-RS 406 (for example, by identifying CQI based on the RSRP or RSSI of the CSI-RS), and the UE may provide the CSI to the base station in the aperiodic CSI report 402. After receiving the CSI report, the base station may transmit a downlink grant 410 which schedules downlink data 412 on a PDSCH. The base station may also determine various parameters for the downlink data transmission on PDSCH based on the aperiodic CSI report 402 (e.g. MCS, rank, resource block allocation, precoder, and transmission power), and the base station may transmit the downlink data accordingly to the UE. For example, if the CSI report 402 includes CQI indicating that the UE determined the channel to have poor SINR, the base station may determine to decrease the MCS to improve the likelihood of successful reception of the downlink data 412.

In addition to uplink grants, the base station may transmit a downlink grant to the UE (e.g. a DCI scheduling a PDSCH transmission) which triggers aperiodic CSI-RS transmissions and CSI feedback. For example, the base station may provide DCI including a CSI trigger field (spanning a number Z bits), which indicates a CSI trigger state including a CSI report setting and a CSI-RS resource setting, and the UE may measure CSI and transmit the aperiodic CSI report in response to the DCI. The UE may provide the aperiodic CSI feedback on PUCCH in response to the DCI, as well as HARQ-ACK feedback on PUCCH in response to downlink data scheduled by the DCI. For example, when the downlink grant triggers an aperiodic CSI report, the UE may multiplex the aperiodic CSI report and the HARQ-ACK feedback in the same PUCCH resource (e.g., within a slot(s), subframe(s), or frame(s) scheduled for a single PUCCH transmission), or the UE may transmit the aperiodic CSI report and the HARQ-ACK feedback in separate PUCCH resources (e.g., within slot(s), subframe(s), or frame(s) respectively scheduled for different PUCCH transmissions). The aperiodic CSI report may be based on A-CSI (e.g., include CQI associated with SNR measurements of aperiodic CSI-RS), or based on PDSCH decoding (e.g., include CQI associated with SNR measurements of DMRS or based on log-likelihood ratios (LLRs) of the downlink data). In response to the CSI report, the base station may adjust MCS or other parameters to result in more reliable or faster, subsequent downlink transmissions. Thus, downlink grant-triggered, aperiodic CSI reporting may support reduced latency and increased reliability in communications.

FIGS. 5A and 5B illustrate examples 500, 550 where a UE transmits an aperiodic CSI report 502, 552 on PUCCH in response to a downlink grant 504, 554 from a base station, where downlink grant 504, 554 schedules downlink data 506, 556 on PDSCH, and where the UE transmits HARQ-ACK feedback 508, 558 on PUCCH in response to the downlink data. In particular, FIG. 5A illustrates the example where the UE transmits the HARQ-ACK feedback 508 and aperiodic CSI report 502 in the same PUCCH resource, while FIG. 5B illustrates the example where the UE transmits the HARQ-ACK feedback 558 and the aperiodic CSI report 552 in separate PUCCH resources. Moreover, while these examples refer specifically to aperiodic CSI feedback based on CSI-RS 510, 560 triggered by downlink grant 504, 554, in other examples, the CSI feedback may be based on DMRS or other downlink signals in PDSCH for decoding the downlink data 506, 556.

In the examples of FIGS. 5A and 5B, the UE may first receive downlink grant 504, 554 which triggers aperiodic CSI-RS 510, 560 and which schedules the PDSCH transmission including the downlink data 506, 556. The downlink grant 504, 554 may also indicate a slot offset index 512, 562 (e.g. K0), which may indicate the slot at which the base station transmits the PDSCH. The downlink grant may further indicate to the UE whether to transmit the aperiodic CSI report 502, 552 and the HARQ-ACK feedback 508, 558 in the same PUCCH resource or in different PUCCH resources. In response to receiving the downlink grant triggering aperiodic CSI reporting, the UE may measure CSI based on the aperiodic CSI-RS 510, 560 or based on the PDSCH including the downlink data 506, 556 (for example, by identifying CQI based on the RSRP or RSSI of the CSI-RS, DMRS, etc.), and the UE may provide the CSI to the base station in the aperiodic CSI report 502, 552. The UE may also provide the HARQ-ACK feedback 508, 558 to the base station in response to the downlink data 506, 556 after a slot offset 514, 564 following receipt of the downlink data (e.g. K1). After receiving the CSI report, the base station may modify, MCS, rank, RB allocation, precoder, transmission power, or other parameters for subsequent downlink data transmissions accordingly.

Thus, in response to a downlink grant, a UE may provide aperiodic CSI on PUCCH with HARQ-ACK feedback in the same PUCCH resources or in separate PUCCH resources. Alternatively, the UE may provide the aperiodic CSI on PUSCH. However, the UE typically provides such aperiodic CSI (on PUCCH or PUSCH) in response to an individual downlink data transmission. For example, if the UE receives one or more downlink grants scheduling multiple downlink data transmissions, the UE reports CSI separately for each individual transmission (e.g., one CSI report for each downlink data transmission). Such individual CSI reporting may be inefficiently waste time and resources of the UE or base station.

Accordingly, to improve efficiency in CSI reporting, aspects of the present disclosure allow a UE to accumulate CSI over time for multiple downlink data transmissions (e.g., transport blocks) scheduled by one or more downlink grants, for example, in a CSI buffer, and to transfer the accumulated CSI to the base station in a single CSI report in response to a CSI report trigger event. For instance, to improve transmission performance, especially for ultra-reliable low latency communication (URLLC) or other high reliability services, the base station may indicate to the UE to send a CSI report including a list of previous, unexpired and unshared (not yet reported) CSI. For example, the base station may provide a downlink grant (e.g., DCI) optionally triggering CSI-RS and scheduling a PDSCH transmission or transport block, and the UE may obtain the CSI based on the CSI-RS (e.g., measured from RSRP of CSI-RS) or based on PDSCH decoding (e.g., measured from DMRS in PDSCH). The UE may similarly obtain CSI from multiple PDSCH transmissions or CSI-RS, and store each CSI in a buffer. When the UE identifies a CSI report trigger event, the UE may report the multiple, stored CSI in the same or separate PUCCH resources used for HARQ feedback in response to the most recent PDSCH transmission.

In one example, a CSI report trigger event may be an indication in DCI to collect a set of CSI measurements across multiple instances (e.g., PDSCH transmissions). For instance, the base station may trigger the UE to provide buffered CSI for multiple previous data transmissions in response to an indication in DCI. The base station may also indicate to the UE to provide the CSI through dedicated configured resources. For instance, in response to receiving the DCI, the UE may report the buffered CSI in the same PUCCH resource as used for HARQ feedback in response to a recent PDSCH transmission, or in a different PUCCH resource. In another example, the CSI report trigger event may be a non-acknowledgement of one or more recent downlink data transmissions. For instance, the base station may trigger the UE to provide the buffered CSI when the UE observes or provides a HARQ-NACK (e.g., a non-acknowledgment of a recent PDSCH transmission), or when the UE observes or provides multiple HARQ-NACKs (e.g., a number of non-acknowledgments for a number of recent PDSCH transmissions). In a further example, the CSI report trigger event may be a "weak" acknowledgment. A weak acknowledgment may refer to an acknowledgment of a data transmission having a LLR quality below a threshold, or a data transmission having an SNR associated with a BLER above a BLER threshold. For instance, the base station may trigger the UE to provide the buffered CSI when the UE observes or provides a HARQ-ACK in response to a recent PDSCH transmission with low LLR quality or SINR associated with high BLER.

In one example, a weak acknowledgment may refer to an acknowledgment of a data transmission having a LLR quality below a threshold. For instance, if a received transport block has a large number of LLRs with a value of or approximately 0, the UE may determine that there is a large number of ambiguous bit values (either 0 or 1) and thus that the quality of the LLRs of the transport block is below a quality threshold. Stated another way, if a received transport block has a small number of LLRs with a positive or negative value, the UE may determine that there is a small number of unambiguous bit values (0 or 1) and thus that the quality of the LLRs of the transport block is below a quality threshold. For example, if a transport block has one million bits, the quality threshold is 900,000 bits (e.g., 900,000 bits should have positive or negative LLRs corresponding to unambiguous bit values 0 and 1, respectively), and only 800,000 bits have LLRs corresponding to unambiguous bit values, the quality of the LLRs (e.g., 800,000) may be below the quality threshold (e.g., 900,000). Thus, even if the UE successfully decodes and acknowledges the transport block due to the unambiguous bit values, the channel quality may be too low as evidenced by the significant number of ambiguous bit values, and so the UE may be triggered to report buffered CSI in response to its "weak" acknowledgment to allow the base station to improve channel estimation.

In another example, a weak acknowledgment may refer to an acknowledgment of a data transmission having an SNR associated with a BLER above a BLER threshold. For instance, if the base station schedules a transport block with a configured MCS, the configured MCS may be associated with a spectral efficiency (SPEF), which in turn may be associated with a nominal SNR for that transmission. For instance, a PDSCH transmission may have a nominal SNR of $SNR=2^{SPEF}-1$, where SPEF is the spectral efficiency corresponding to a configured MCS. This nominal SNR may correspond to a target BLER (e.g., 10% BLER). However, if an observed SNR of the transport block at the UE (e.g., measured based on RSRP) is less than the nominal SNR due to poor channel conditions, the observed SNR may correspond to a higher BLER than the target BLER (e.g., 20% BLER or some other number larger than 10%). Thus, even if the UE successfully decodes and acknowledges the transport block, the channel quality may be too low as evidenced by the observed SNR and associated BLER, and so the UE may be triggered to report buffered CSI in response to its "weak" acknowledgment to allow the base station to improve channel estimation.

In response to receiving the buffered CSI, the base station may correct its outer loop behavior. Generally, a base station may schedule MCS or other parameters of subsequent downlink transmissions based on an inner loop behavior and an outer loop behavior. In the inner loop behavior, the base station may select a MCS for a subsequent data transmission based on instantaneous CSI to achieve a target BLER (e.g., 10%). For instance, the base station may select an MCS corresponding to the target BLER for each subsequent data transmission in response to an individual CSI for a previous data transmission. In outer loop behavior, the base station may select a MCS for subsequent data transmissions based on an average performance of previous data transmissions to achieve the target BLER. For instance, the base station may update the MCS corresponding to the target BLER (originally selected during inner loop behavior) for subsequent data transmissions in response to an average CSI for multiple previous data transmissions, a number of non-acknowledgments or acknowledgments for the previous data transmissions, or other factors over time. Therefore, as the updating of MCS during outer loop behavior is not instantaneous, the updated MCS may thus not take into account recent channel condition changes and thus result in a higher BLER than the target BLER. Aspects of the present disclosure thus allow the UE to provide buffered CSI for multiple downlink data transmissions to the UE, for instance, in response to a weak acknowledgment, so that the base station may correct its outer loop behavior (e.g., select a more accurate updated MCS).

Figure 6:
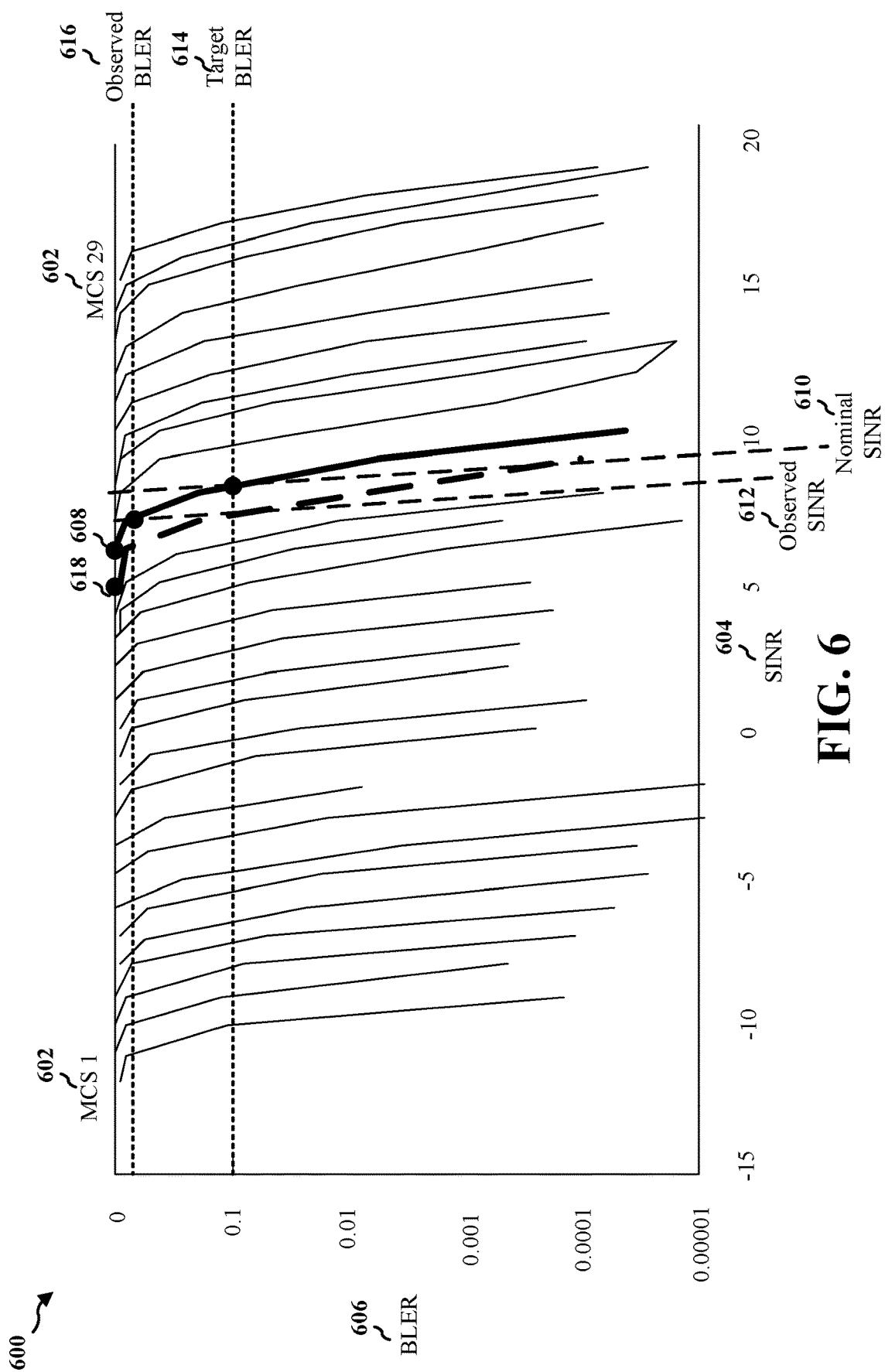
FIG. 6 is a diagram illustrating an example plot of signal to noise interference ratios (SINRs) and block error rates (BLERs) for different modulation and coding schemes (MCS).

FIG. 6 illustrates an example 600 of a plot illustrating different MCS 602 and their corresponding SINR 604 and BLER 606. When the base station schedules one of the different MCS for a transport block, for example, scheduled MCS 608, the UE may estimate a different SINR than a nominal SINR 610 associated with the scheduled MCS due to changing channel conditions. For instance, the UE may measure an RSRP of CSI-RS or DMRS and identify an observed SINR 612 for the transport block. When the observed SINR is less than the nominal SINR such as illustrated in the example of FIG. 6, the UE may determine that the current BLER is higher than a target BLER 614 for the scheduled MCS. For instance, the UE may determine that observed BLER 616 corresponding to the observed SINR is higher than the target BLER corresponding to the nominal SINR (e.g., above 10% BLER). Nevertheless, the UE may still receive and successfully decode the transport block given the observed SINR notwithstanding the observed BLER. Accordingly, the UE may provide an acknowledgment to the base station in response to the transport block and report the buffered CSI for this transport block and previous transport blocks. In response to receiving the CSI report, the base station may correct its outer loop behavior, for example, by adapting its MCS to better correspond to the observed SINR and improve the BLER. For instance, the base station may select corrected MCS 618 for its subsequent transport blocks, which corresponds to the observed SINR and the target BLER as illustrated in the example of FIG. 6, thereby improving the BLER and providing higher transmission reliability.

Additionally, after receiving the CSI stored in the UE's CSI buffer, the base station may compute statistics to improve the CSI-RS configurations as well as the PDSCH transmission parameters, thereby improving reliability of new transmissions (e.g., in response to HARQ-ACKs) as well as retransmissions (e.g., in response to HARQ-NACKs). The base station may similarly use the CSI and other observations to compute statistics and measurements on the predicted interference at the UE (e.g., based on a comparison of the different CSI reported by the UE across time). For instance, the base station may calculate a variance between each of the reported CSIs (e.g., CQI), and if the variance between one of the reported CSI and another one of the reported CSI exceeds a threshold (e.g., has a high variance between CQI), the base station may determine that the channel has significantly changed in a short period of time due to a large Doppler effect or interference, and the base station may choose a corrected MCS accordingly. For example, the base station may select a new MCS in response to the CSIs associated with the high variance, rather than based on instantaneous CSI. In this way, transmission performance may further be improved.

In one aspect of the present disclosure, the base station may retrieve up to M CSI reports from the UE in response to a CSI report trigger event. For instance, the UE may send in a single CSI report the M latest, unexpired, and un-shared (un-reported) CSI reports that the UE accumulated in response to the CSI report trigger event. The base station may configure the CSI report trigger event according to various modes or examples. In one mode, the CSI report trigger event may be an ACK of a downlink data transmission with low LLR quality or high BLER (a weak acknowledgment). An example of a weak acknowledgment is described above with respect to FIG. 6. In another mode, the CSI report trigger event may be a NACK or multiple NACKs (e.g., X NACKs within L transmissions). For example, if the UE receives 5 PDSCH transmissions (L=5) and responds NACK to three of the transmissions (X=3), the most recent NACK may result in the CSI report trigger event. In another mode, the CSI report trigger event may be an indicator (e.g., in DCI) from the base station. For example, the base station may configure a parameter in DCI indicating whether the CSI report trigger event has occurred (e.g., a flag or bit which the base station may set as the event trigger). In another mode, the CSI report trigger event may be a combination of any of the foregoing modes. For example, the UE may report the M CSI to the base station in response to X NACKs within L transmissions and the DCI indication, or in response to a weak ACK and the DCI indication. In any of these modes, the values of M, L, and X may be RRC or MAC-CE parameters which the base station may configure and provide to the UE. Moreover, the value of M may be configured based on UE capability (e.g., a number N of CSI the UE may store in its CSI buffer), such that M≤N. For example, if the UE provides a capability information message to the base station indicating that the UE is capable of storing at most 10 prior CSIs at a time (N=10), the base station may configure the UE in a CSI report configuration or other configuration to report up to 10 prior CSIs (M≤10) following a CSI report trigger event.

Figure 7:
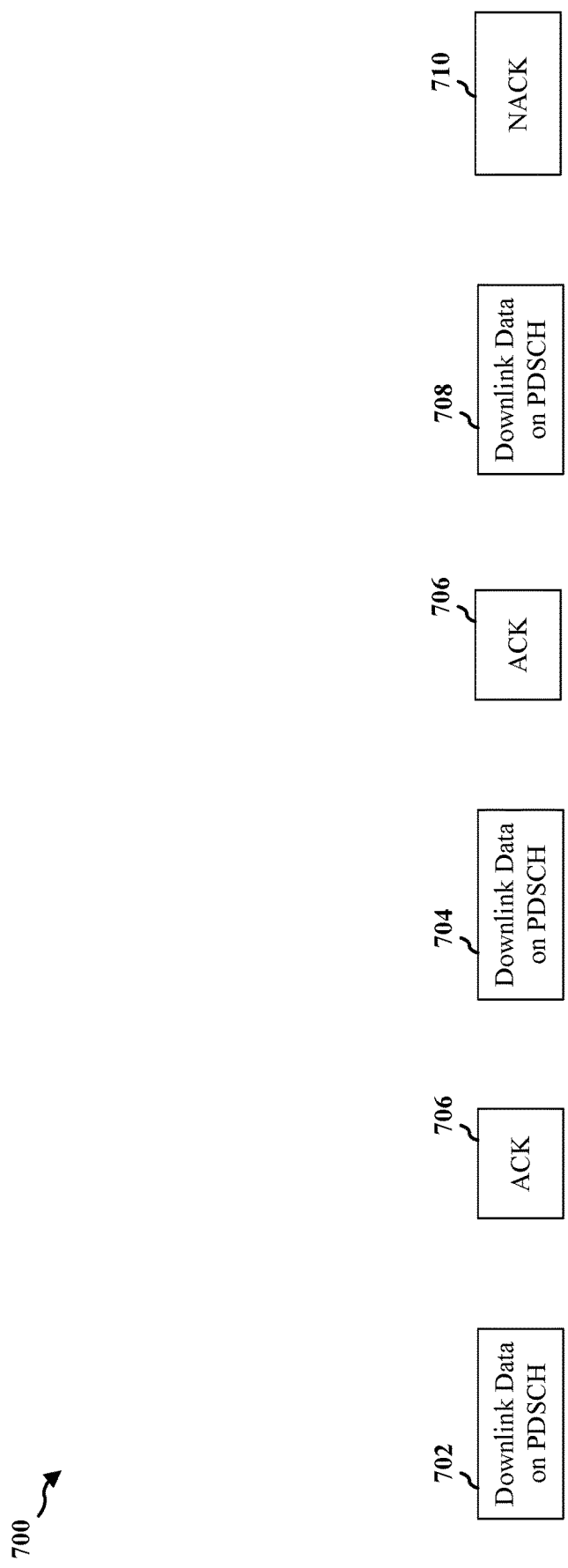
FIG. 7 is a diagram illustrating an example of a CSI report trigger event comprising a NACK in response to a downlink data transmission.

The base station may also indicate the UE to report certain CSI from the last M transmissions, e.g., through a bitmap. For instance, after the base station configures the UE to buffer and report M CSI in response to previous PDSCH transmissions, the base station may provide a bitmap indicating to the UE which of the M CSI in the buffer the UE is to send in response to the CSI trigger event. The bitmap may have a length of M bits, with each bit corresponding to one of the CSI stored in the buffer (with the most significant bit representing the oldest CSI and the least significant bit representing the newest CSI), and the base station may indicate through the bitmap which CSI the UE is to report based on the value of the corresponding bit (e.g., '1' to report and '0' not to report, or vice-versa). For example, if the base station configures the UE to report 4 CSI (M=4) according to the bitmap '1001', the UE may only report the oldest and newest CSI while refraining from reporting the second oldest and second newest CSI. The base station may provide the bitmap to the UE in the CSI report configuration or other configuration.

Where the base station configures the CSI report trigger event as a NACK, the UE may maintain a buffer of CSIs corresponding to ACKs, and then share the M CSI once the NACK is observed. For instance, FIG. 7 illustrates an example 700 where the UE receives and successfully decodes first downlink data 702 on PDSCH and second downlink data 704 on PDSCH, and accordingly responds with an ACK 706 to the base station for the first downlink data and second downlink data. The UE may also measure and store CSI for the first downlink data and the second downlink data, respectively, in the CSI buffer for subsequent CSI reporting. Moreover, in this example, the UE fails to successfully decode third downlink data 708 on PDSCH (e.g., due to change in channel condition), and accordingly responds with a NACK 710 to the base station. As a result of the NACK (the CSI report trigger event in this example), the UE may report the CSI stored in the CSI buffer based on the configured value M. For example, if M=1, the UE may only report the stored CSI for third downlink data 708 (the most recent PDSCH transmission). Alternatively, if M=2, the UE may only report the stored CSI for second downlink data 704 and third downlink data 708 (the two most recent PDSCH transmissions). Alternatively, if M=3, the UE may report the stored CSI for the first downlink data 702, second downlink data 704, and third downlink data 708. The UE may provide the M CSI in the same CSI report to the base station.

In any of the above examples, the base station may configure an expiration time for CSI (e.g., through an RRC configuration or a MAC-CE), and the UE may determine whether measured CSI has expired based on the expiration time. For instance, the UE may begin to count a timer in response to measuring CSI for a PDSCH transmission, and once an amount of time elapsed on the timer exceeds the configured expiration time, the UE may conclude the CSI has expired. The base station may configure the expiration time for each CSI (CSI aging) in part based on Doppler effect (e.g., how fast the UE is moving) or a coherence time of the channel (e.g., how fast the channel is changing over time). The expiration time may also be configured in number of PDSCH transmissions (e.g., CSI measured for one PDSCH transmission will expire after a specified number of subsequent PDSCH transmissions are received), or in a unit of time.

Accordingly, the base station may indicate to the UE, through the expiration time for CSI, the time window during which the CSI may be of value to the base station, and the UE may refrain from reporting expired CSI at the time a CSI report trigger event occurs. For example, in response to the CSI report trigger event, the UE may compare the amount of time elapsed on the timer for measured CSI with the configured expiration time. If the UE determines that the amount of time elapsed does not exceed the configured expiration time, the UE may conclude that the measured CSI has not yet expired, and therefore the UE may report the measured CSI in response to the CSI report trigger event. The UE may similarly check whether other measured CSI has expired at the time the UE is triggered to provide the CSI report. Thus, all CSI included in the CSI report may have an expiration time following the CSI report trigger event.

Figure 8:
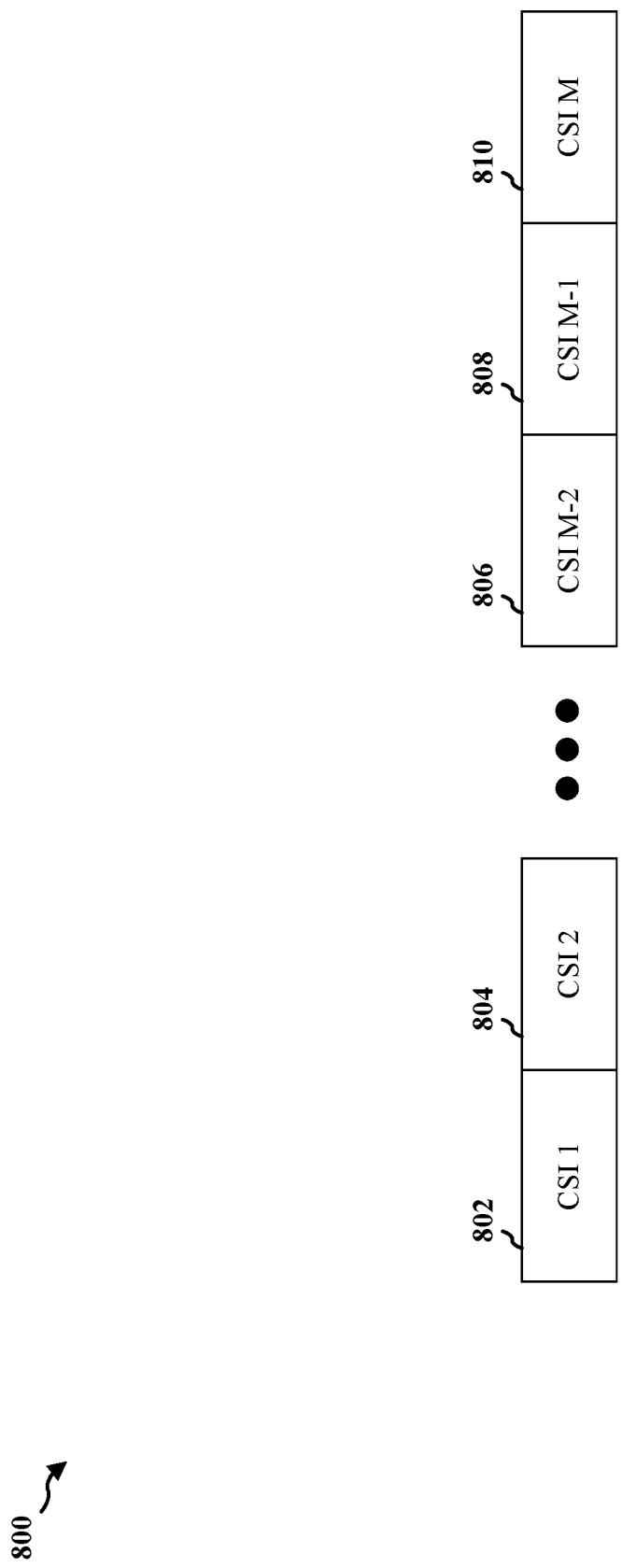
FIG. 8 is a diagram illustrating an example of a CSI buffer storing CSI at the UE.

FIG. 8 illustrates an example of a CSI buffer 800 at the UE in which the UE stores CSI measured for previous downlink data transmissions. The CSI buffer may store M CSI, where each CSI corresponds to a downlink data transmission in an order of time received. For instance, CSI 1 802 may include CSI which the UE measures and stores for an oldest (earliest received) PDSCH transmission, CSI 2 804 may include CSI measured and stored for a second oldest PDSCH transmission, and so forth until CSI M-2 806 which may include CSI measured and stored for a third newest PDSCH transmission, CSI M-1 808 which may include CSI measured and stored for a second newest PDSCH transmission, and CSI M 810 which may include CSI measured and stored for a newest (latest received) PDSCH transmission. The size of the CSI buffer may be based on UE capability (e.g., the number of CSI, M, which the UE may store in the buffer may be at most N CSI, or M≤N). Each time the UE receives a PDSCH transmission, the UE measures CSI for that PDSCH transmission and stores the CSI in the buffer at the corresponding location, until the CSI buffer becomes full. Once the UE receives a CSI report event trigger, in one example, the UE may report all of the CSI stored in the buffer in a single CSI report. For instance, in response to receiving a NACK for a most recent PDSCH transmission (corresponding to CSI M 810), the UE may report CSI 1 802, CSI 2 804, and so forth including CSI M-2 806, CSI M-1 808, and CSI M 810 in the CSI report. In another example, the UE may report some of the CSI stored in the buffer in response to a bitmap indicating the CSI to report. For instance, assuming M=8 in this example and in response to receiving a bitmap '10000001', the UE may report CSI 1 802 and CSI M 810, but not CSI 2 804, CSI M-1 808, or any other CSI in between.

After the UE reports or shares a CSI with the base station, or if the CSI expires before being shared, the UE may discard that CSI from the buffer, and the UE may continue to store new CSI for other PDSCH transmissions in the opened buffer locations. For instance, if the UE reports all the CSI stored in the buffer in response to the CSI report trigger event, the UE may discard all the CSI to empty the buffer and proceed to measure and store new CSI for subsequent PDSCH transmissions following the CSI report trigger event. Similarly, if the UE reports some of the CSI stored in the buffer in response to the bitmap, the UE may discard only the reported CSI stored in the buffer and proceed to measure and store new CSI for subsequent PDSCH transmissions in the opened buffer locations. Alternatively, if any un-reported CSI has expired before it is reported, the UE may discard the expired CSI from the buffer and proceed to measure and store new CSI for subsequent PDSCH transmissions in the opened buffer locations. Thus, the UE may store and report un-expired and un-shared CSI with the base station.

When the base station configures the CSI report trigger event as a weak acknowledgment, the UE may report M CSI once an ACK is observed. The UE may report the CSI and ACK in uplink control information (UCI) on PUCCH. However, with the ACK alone, the base station may not be able to determine whether the ACK is a weak acknowledgment or a strong acknowledgment (e.g., an acknowledgment for a PDSCH transmission with high LLR quality or target BLER). As a result, the base station may not be able to differentiate between weak and strong ACKs and thus may in some cases not correct its outer loop behavior (e.g., update MCS or other parameters) in response to the ACK, notwithstanding the CSI. Accordingly, to indicate to the base station to correct its outer loop behavior in response to a weak ACK, the UE may provide an indicator accompanying the ACK informing the base station whether the ACK is weak or strong. For example, the UCI may be configured with a two-bit codebook for HARQ feedback where '10' indicates a weak ACK and '11' indicates a strong ACK (with '00' indicating a NACK). Moreover, the base station may configure the UE to provide the UCI including the weak ACK in two stages, with the first stage UCI including the HARQ feedback and weak/strong indicator (e.g., based on the two-bit codebook), and the second-stage UCI including the CSI report (the list of CSI stored in the CSI buffer). Otherwise, if the UE is providing the CSI report in response to a strong ACK (or a NACK), the UE may be configured to simply provide the HARQ feedback and weak/strong indicator in a single stage UCI, since the UE does not provide the CSI report in that scenario.

Figure 9:
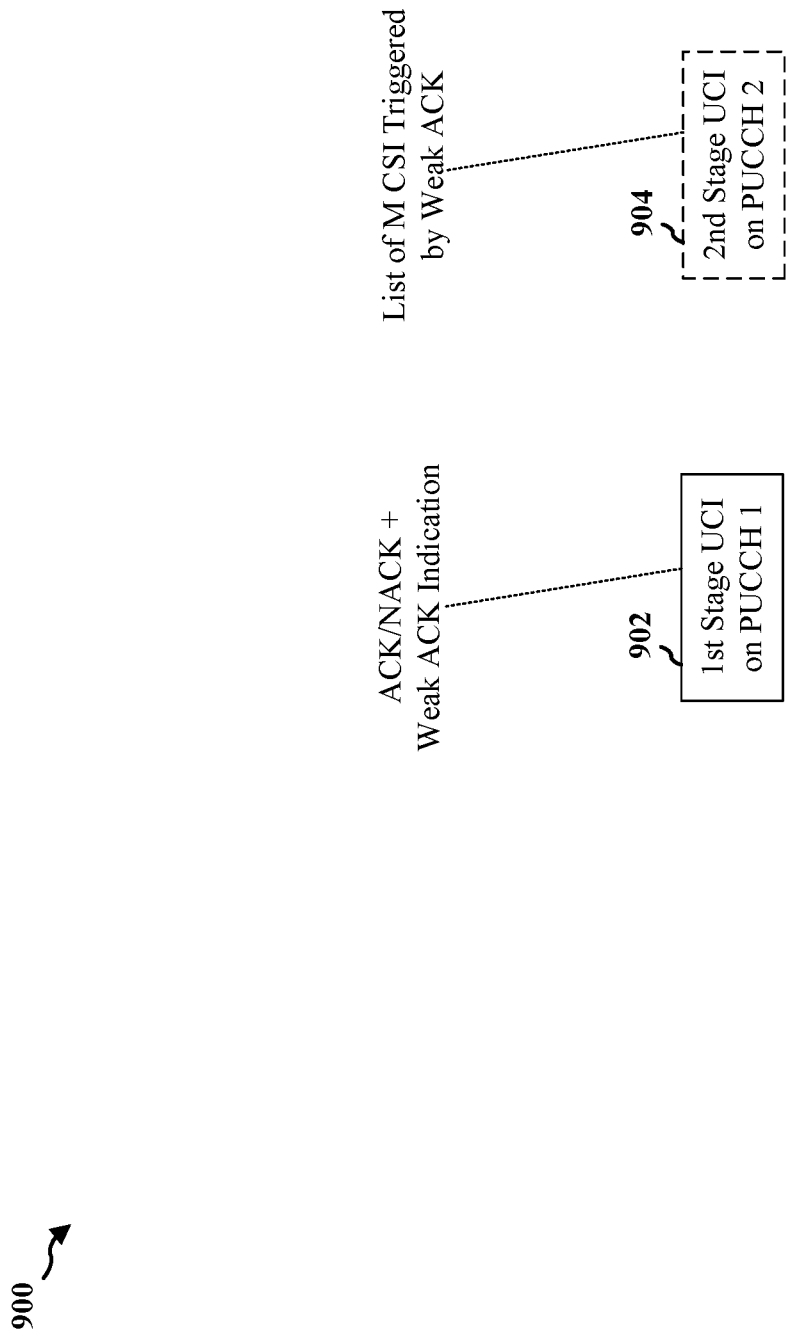
FIG. 9 is a diagram illustrating an example of two-stage UCI in which the UE sends the CSI report as well as hybrid automatic repeat request (HARQ) feedback to the base station.

For instance, FIG. 9 illustrates an example 900 where the UE sends UCI on PUCCH including an ACK, an additional bit indicating whether the ACK is weak or strong, and a CSI report in response to a weak ACK. If the ACK is a weak acknowledgment, the UE may transmit the UCI in two stages, namely a first stage UCI 902 in one PUCCH resource including the ACK and the weak ACK indicator, and a second stage UCI 904 in another PUCCH resource including the CSI report. Otherwise, if the ACK is a strong acknowledgment, the UE may transmit a single stage UCI including the ACK, rather than a two-stage UCI, without the CSI report. Similarly, the UE may transmit NACK in single stage UCI with a CSI report.

In another aspect of the present disclosure, the base station may configure the UE to select how many CSI (out of M) to measure and store in the CSI buffer and send in a CSI report in response to a CSI report trigger event. For instance, in response to observing a DCI indicator, one or more NACKs, a weak ACK, or a combination of these trigger events, the UE may send in a single CSI report the latest M', unexpired and un-shared CSI, where M'<M. For instance, if the base station configures the UE to report up to a maximum of four CSI following a CSI report trigger event (M=4), the UE may select to measure, store, and report a smaller number of CSI (e.g. M'=3 or less) and accordingly provide the most recent three or less stored CSI in the CSI buffer accordingly. Alternatively, the UE may select M' to be the same value as M. When the UE reports the CSI, the UE may also indicate the value of M to the base station (e.g., in UCI) so that the base station may determine how many CSI the base station will receive in the CSI report. After sharing the M' CSI, the UE may discard the selected CSI in the CSI buffer and continue to measure and store CSI for subsequent data transmissions in the opened locations accordingly for subsequent CSI reporting.

Figure 10:
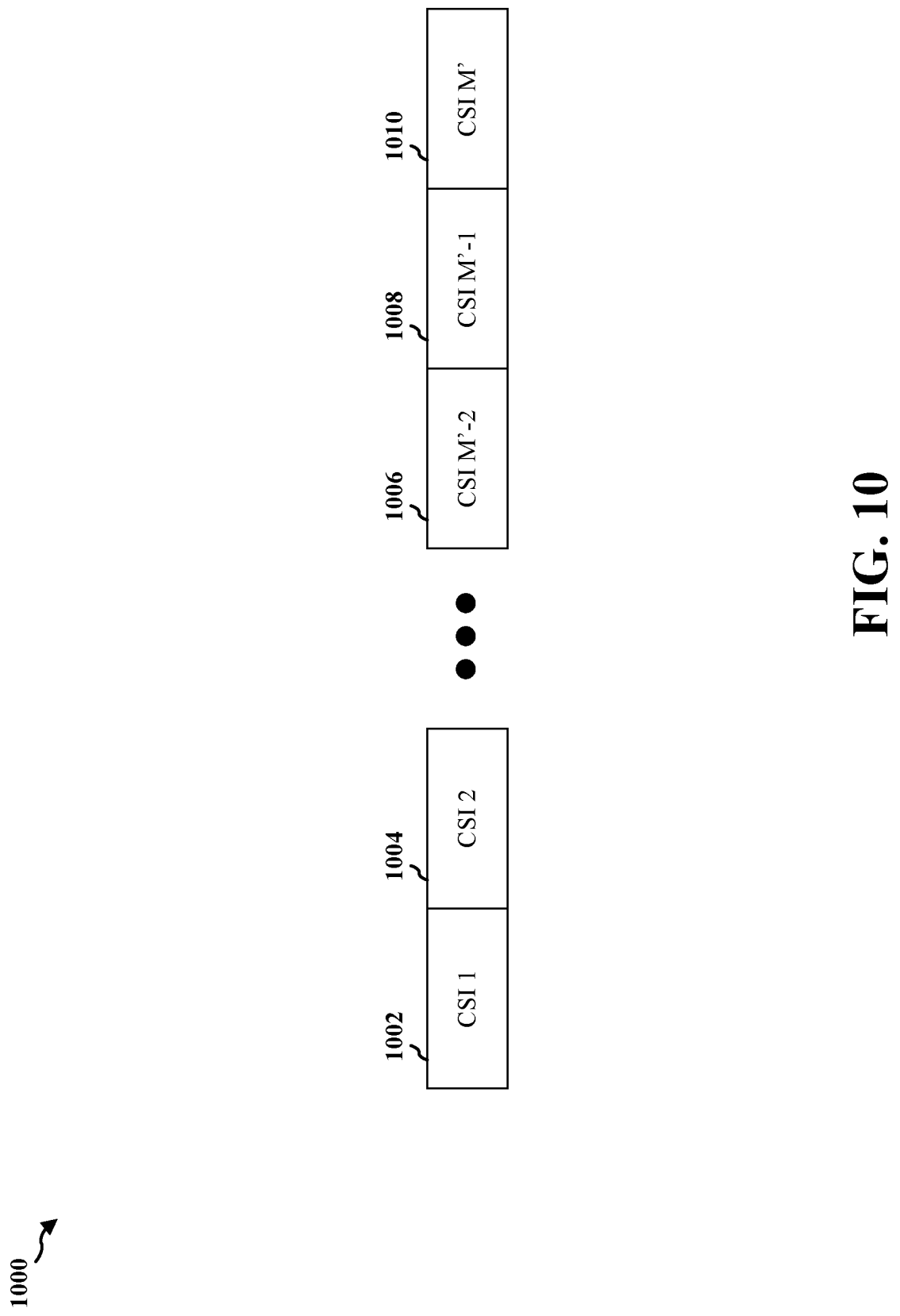
FIG. 10 is a diagram illustrating another example of a CSI buffer storing CSI at the UE.

FIG. 10 illustrates an example of a CSI buffer 1000 at the UE in which the UE stores CSI measured for previous downlink data transmissions. The CSI buffer may store M' CSI, where each CSI corresponds to a downlink data transmission in an order of time received. For instance, CSI 1 1002 may include CSI which the UE measures and stores for an oldest (earliest received) PDSCH transmission, CSI 2 1004 may include CSI measured and stored for a second oldest PDSCH transmission, and so forth until CSI M'-2 1006 which may include CSI measured and stored for a third newest PDSCH transmission, CSI M'-1 1008 which may include CSI measured and stored for a second newest PDSCH transmission, and CSI M' 1010 which may include CSI measured and stored for a newest (latest received) PDSCH transmission. The size of the CSI buffer may correspond to the number of CSI which the UE may select for measuring and reporting (e.g., the number of CSI, M', which the UE may store in the buffer may be less than M CSI, or M'<M). Each time the UE receives a PDSCH transmission, the UE measures CSI for that PDSCH transmission and stores the CSI in the buffer at the corresponding location, until the CSI buffer becomes full. Once the UE receives a CSI report event trigger, in one example, the UE may report all of the CSI stored in the buffer in a single CSI report. For instance, in response to receiving a NACK for a most recent selected PDSCH transmission (corresponding to CSI M' 1010), the UE may report CSI 1 1002, CSI 2 1004, and so forth including CSI M'-2 1006, CSI M'-1 1008, and CSI M' 1010 in the CSI report.

After the UE reports or shares a CSI with the base station, or if the CSI expires before being shared, the UE may discard that CSI from the buffer, and the UE may continue to store new CSI for other PDSCH transmissions in the opened buffer locations. For instance, if the UE reports all the CSI stored in the buffer in response to the CSI report trigger event, the UE may discard all the CSI to empty the buffer and proceed to measure and store new CSI for subsequent PDSCH transmissions following the CSI report trigger event. Alternatively, if any un-reported CSI has expired before it is reported, the UE may discard the expired CSI from the buffer and proceed to measure and store new CSI for subsequent PDSCH transmissions in the opened buffer locations. Thus, the UE may store and report un-expired and un-shared CSI with the base station.

Additionally, the UE may decide the value of M', or how many CSI the UE selects for reporting, based on the expiration time configured by the base station for each of the M configured CSI. As described above, the base station may configure an expiration time for each CSI, and the UE may determine whether the CSI has expired based on the expiration time. Thus, the UE may exclude all expired CSI in the CSI buffer before selecting the value of M'. For instance, if the UE includes a CSI buffer storing M CSI (one for each prior PDSCH transmission), and the UE determines that at least one of these CSI has expired as described above, the UE may discard these expired CSI from the buffer and select the value of M' from the remaining CSI in the buffer. For example, if the CSI buffer stores ten CSI and one of the CSI expires before the CSI report trigger event, the UE may select any value up to nine for M' (M'=9<M=10).

When the UE determines to report M' CSI in response to a CSI report trigger event, the UE may report the CSI and HARQ feedback in UCI on PUCCH. However, with this information alone, the base station may not be able to determine how many CSI the base station will receive due to the variability in the value of M'. Accordingly, the UE may provide an indicator accompanying the HARQ feedback informing the base station of the value of M'. For example, in response to a CSI report trigger event, the base station may configure the UE to provide the UCI including buffered CSI in two stages, with the first stage UCI including the HARQ feedback and value of M', and the second-stage UCI including the CSI report (the list of CSI stored in the CSI buffer).

Figure 11:
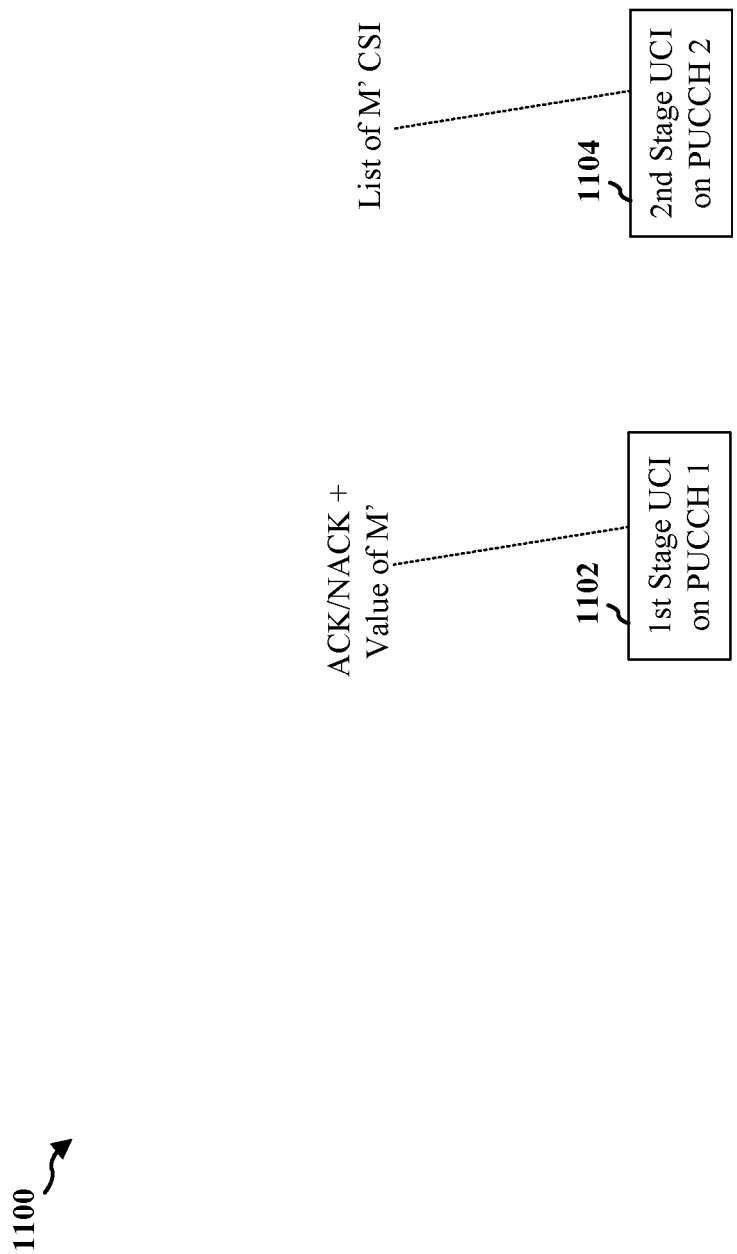
FIG. 11 is a diagram illustrating another example of two-stage UCI in which the UE sends the CSI report as well as HARQ feedback to the base station.

For instance, FIG. 11 illustrates an example 1100 where the UE sends UCI on PUCCH including an ACK, an additional number of bits indicating the value of M', and a CSI report in response to a CSI report trigger event. As illustrated in this example, the UE may transmit the UCI in two stages, namely a first stage UCI 1102 in one PUCCH resource including the HARQ feedback and the value of M', and a second stage UCI 1104 in another PUCCH resource including the CSI report. In this way, the base station may determine from the first-stage UCI the number of CSI that the base station will receive in the second-stage UCI, and the base station may correct its outer loop behavior based on the received CSI accordingly.

Thus, the UE may provide a CSI report including M configured CSI or M' selected CSI in response to a CSI report trigger event to allow the base station to correct outer loop behavior and improve transmission performance. Each of the CSI which the UE reports may include one or more of the following parameters: CQI, RI, instantaneous SINR or SPEF, energy metrics based on LLRs, bit error rate (BER), or BLER. In one example, the CSI may include an averaged CQI using infinite impulse response (IIR) filters, which the UE may report given a sufficient number of bits in the CSI report payload. For example, the UE may apply IIR filtering to an average CQI computed over prior PDSCH transmissions and report the average CQI in addition to the instantaneous CQI for each prior PDSCH transmission in the CSI report. The UE may also enable or disable the reporting of this average CQI. In another example, the CSI may include a RI. In another example, the CSI may include instantaneous SINR or SPEF quantized using L levels. For example, if a 1-bit quantizer is configured (L=2) for a SINR or SPEF limited to a value between a lower boundary (e.g., 0) and an upper boundary (e.g., 100), the UE may report a bit indicating whether the SINR or SPEF of the corresponding PDSCH transmission for that CSI falls within one of the two levels between those boundaries (e.g., SINR 0-50 may be represented by bit value 0 and SINR 51-100 may be represented by bit value 1, or vice-versa). The number of levels L (and thus number of quantized bits) for each CSI may be RRC or MAC-CE configured. In a further example, the CSI may include an energy metric based on LLRs. For instance, for each PDSCH transmission, the UE may calculate an energy metric based on the LLRs of that transmission and report that metric in the CSI corresponding to that PDSCH transmission. For example, the energy metric may be an average of the absolute value of each LLR in the PDSCH transmission, or some other metric. In other examples, the CSI may include the BER of each bit of the PDSCH transmission, or the BLER of the PDSCH transmission.

Figure 12:
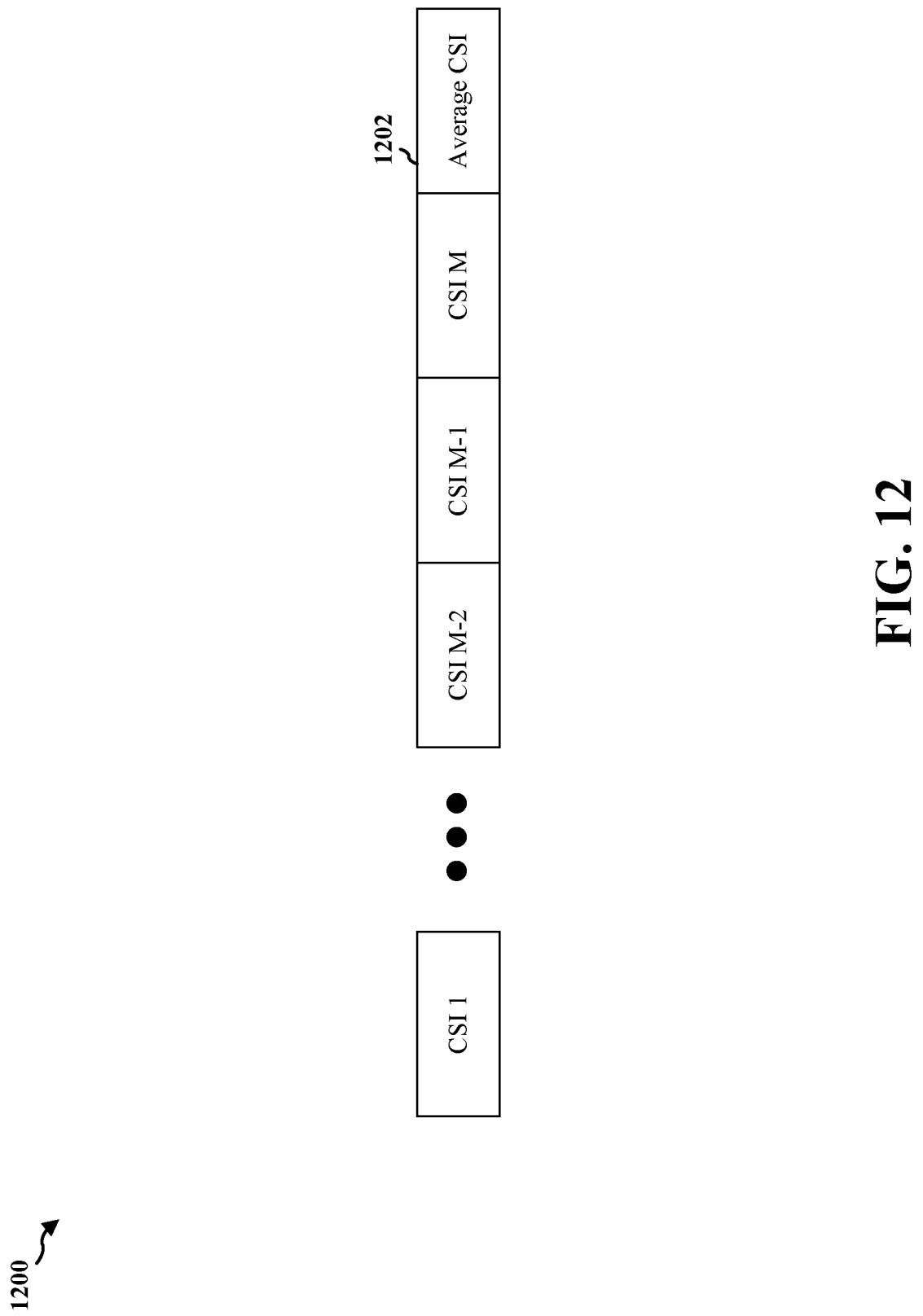
FIG. 12 is a diagram illustrating another example of a CSI buffer storing CSI at the UE.

FIG. 12 illustrates an example of a CSI buffer 1200 at the UE in which the UE stores CSI measured for previous downlink data transmissions. The CSI buffer may store M CSI, where each CSI corresponds to a downlink data transmission in an order of time received. For instance, CSI 1 may include CSI which the UE measures and stores for an oldest (earliest received) PDSCH transmission, CSI 2 may include CSI measured and stored for a second oldest PDSCH transmission, and so forth until CSI M-2 which may include CSI measured and stored for a third newest PDSCH transmission, CSI M-1 which may include CSI measured and stored for a second newest PDSCH transmission, and CSI M which may include CSI measured and stored for a newest (latest received) PDSCH transmission. Thus, CSI buffer 1200 may correspond to CSI buffer 800 in FIG. 8. Alternatively, the CSI buffer 1200 may store M' CSI, corresponding to CSI buffer 1000 in FIG. 10. Moreover, in the example of FIG. 12, the CSI buffer 1200 may also store an average CQI 1202 that the UE calculates from the M (or M') stored CSI and applies IIR filtering. Furthermore, each of the M (or M') CSI may include any one or more of instantaneous CQI, RI, instantaneous SINR or SPEF, energy metrics based on LLRs, BER, or BLER. Once the UE receives a CSI report event trigger, the UE may report the CSI stored in the buffer including average CQI 1202 in a single CSI report.

Figure 13:
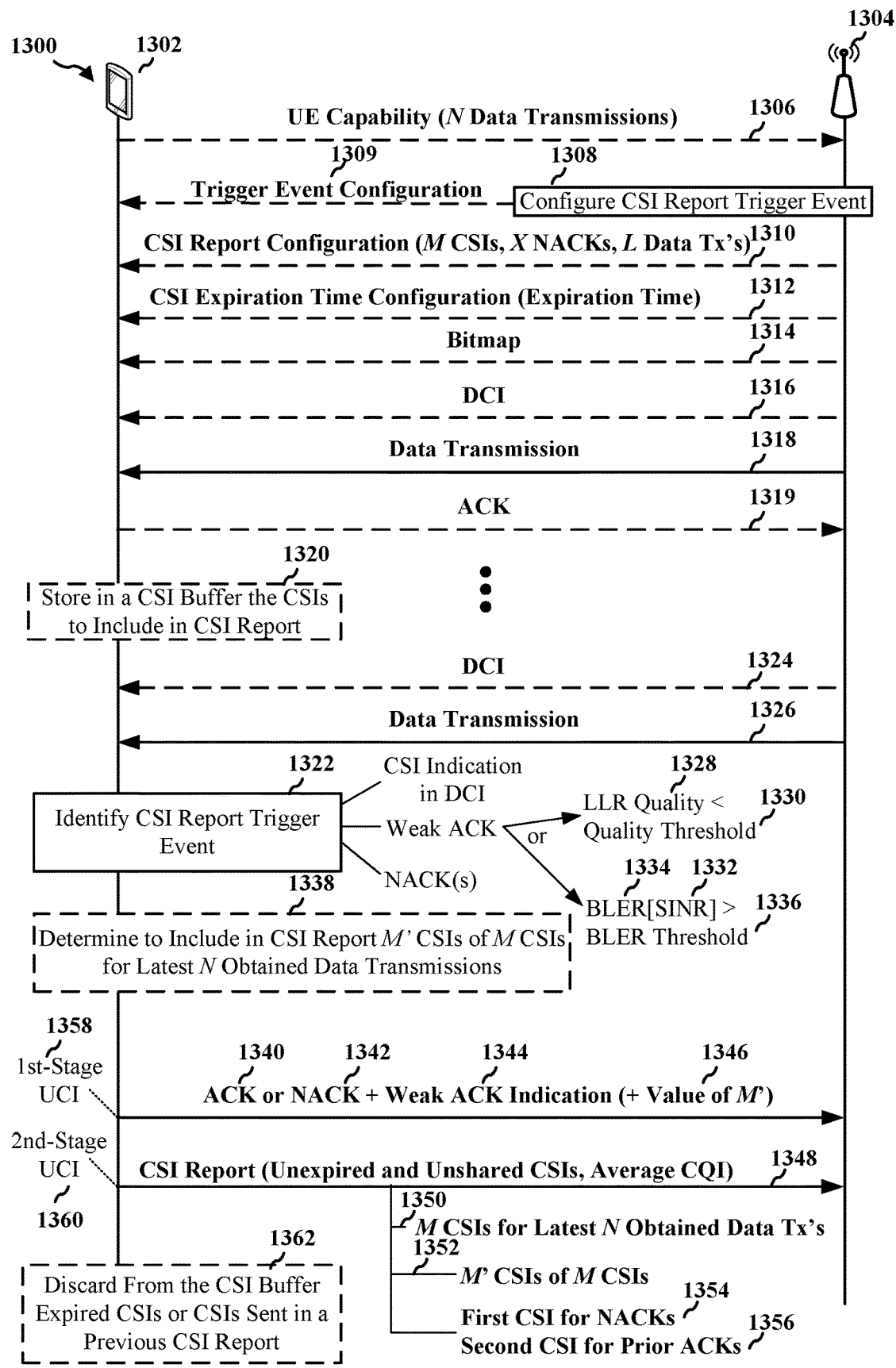
FIG. 13 is a call flow diagram between a UE and a base station.

FIG. 13 illustrates an example 1300 of a call flow between a UE 1302 and a base station 1304. Initially, the UE may provide a capability information message 1306 to the base station. The capability information message may indicate a number N data transmissions for each of which the UE is capable of storing CSI. For instance, the capability information message may indicate a maximum number N of CSI the UE may store at a time in a CSI buffer.

At 1308, the base station 1304 may configure a CSI report trigger event. The CSI report trigger event may be, for example, a DCI indication, one or more NACKs, or a weak ACK. The base station may inform the UE 1302 of the configured CSI report trigger event in a trigger event configuration 1309. The base station may also provide the UE a CSI report configuration 1310 indicating a configured number M of CSI which the UE may report in response to the CSI report trigger event. For multiple-NACK CSI report trigger events (e.g., X NACKs within L transmissions), the CSI report configuration 1310 may also indicate a configured number X of NACKs and a configured number L of data transmissions. Furthermore, the base station may also send the UE a CSI expiration time configuration 1312 indicating a configured expiration time for each of the CSI. Additionally, the base station may provide the UE a bitmap 1314 indicating which of the M CSI the UE is configured to report in response to the CSI report trigger event. The trigger event configuration, CSI report configuration, CSI expiration time configuration, and bitmap may be different parameters of an RRC configuration or indicated in a same MAC-CE, or may be indicated in different RRC configurations or different MAC-CEs, or may be indicated in a combination of one or more RRC configurations or MAC-CEs.

The base station 1304 may transmit a DCI 1316 to the UE 1302 scheduling a data transmission 1318. In this example, the UE may successfully receive and decode data transmission 1318 and therefore feedback an ACK 1319 in response to the data transmission. The UE may also measure CSI for data transmission 1318, and at 1320, the UE may store the CSI in a CSI buffer to later include in a CSI report. Similarly, the base station may schedule and transmit other downlink data transmissions to the UE, and the UE may continue to provide HARQ feedback in response to each scheduled data transmission. The UE may also continue to measure and store CSI for each data transmission at 1320 until the CSI buffer is full (up to M CSI).

Next, at 1322, the UE may identify a CSI report trigger event. For instance, in one example, the UE may observe a CSI indication in DCI (e.g., in DCI 1324) scheduling data transmission 1326. In another example, the UE may fail to decode data transmission 1326 and thus observe that it is to feedback NACK in response to data transmission 1326. In a further example, the UE may successfully decode data transmission 1326 but determine that the data transmission 1326 includes either a LLR quality 1328 below a quality threshold 1330 or a SINR 1332 associated with a BLER 1334 above a BLER threshold 1336, and thus the UE may observe that it is to feedback a "weak" ACK in response to data transmission 1326. The UE may determine which of the aforementioned CSI report trigger events to observe from the trigger event configuration 1309. Moreover, at 1338, the UE may optionally determine M' CSIs of the M CSIs for a latest N obtained data transmissions to include in the CSI report.

After identifying the CSI report trigger event (and optionally the M' CSIs), the UE 1302 may provide ACK 1340 or NACK 1342 to the base station 1304 depending on whether the data transmission 1326 was decoded successfully or not. The UE may also provide a weak ACK indication 1344 indicating whether the ACK 1340 (if sent) is a weak ACK or not, and optionally provide a value of M' 1346 if determined at 1338. The UE may further provide a CSI report 1348 to the base station, including unexpired and un-shared CSI stored in the CSI buffer at 1320 for prior data transmissions (e.g., data transmissions 1318, 1326) as well as an average CQI across the data transmissions. The CSI report may include, for example, M CSI 1350 for a latest N obtained data transmissions from base station 1304, or M' CSI 1352 of the M CSI. Where the CSI report trigger event is one or more NACKs, the CSI report may similarly include first CSI 1354 for the NACK(s) (e.g., a portion of the M or M' CSI), and second CSI 1356 for prior ACK(s) to the NACK(s) (e.g., a remainder of the M or M' CSI). If the UE provides weak ACK indication 1344 or value of M' 1346, the UE may transmit this information along with the ACK 1340 or NACK 1342 in a first-stage UCI 1358 and the CSI report 1348 in a second-stage UCI 1360. Otherwise, the UE may transmit the ACK or NACK, and the CSI report, in a single stage UCI.

Finally, at 1362, the UE 1302 may discard from the CSI buffer expired CSIs or CSIs sent in a previous CSI report. For instance, after sending CSI report 1348 including M or M' CSI, the UE may discard that reported CSI from the CSI buffer. Similarly, if any of the CSI in the buffer expires prior to the CSI report trigger event, the UE may discard that expired CSI from the buffer.

Figure 14:
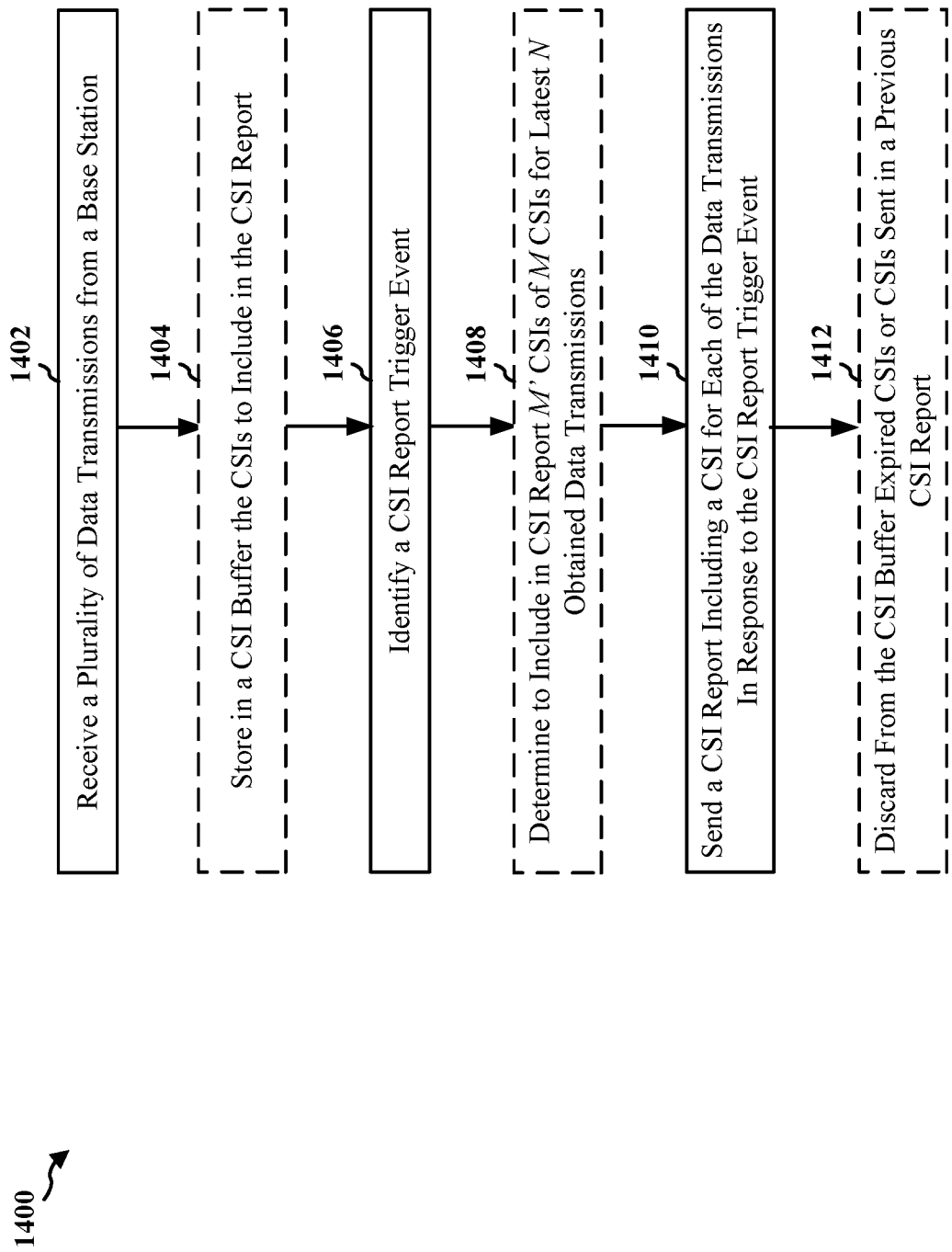
FIG. 14 is a flowchart of a method of wireless communication at a UE.

FIG. 14 is a flowchart 1400 of a method of wireless communication. The method may be performed by a UE (e.g., the UE 104, 602; the apparatus 1602). Optional aspects are illustrated in dashed lines. The method allows a UE to accumulate CSI over time for multiple downlink data transmissions in a CSI buffer and to transfer the accumulated CSI to the base station in a single CSI report in response to a CSI report trigger event, thereby improving efficiency in CSI reporting.

At 1402, the UE receives a plurality of data transmissions from a base station. For example, 1402 may be performed by data transmission component 1640. For instance, referring to FIG. 13, the UE 1302 may receive data transmissions 1318, 1326 from the base station 1304. For example, referring to FIG. 7, the UE may receive downlink data 702, 704, 708 on PDSCH, with each of the downlink data corresponding to one of the data transmissions.

At 1404, the UE may store in a CSI buffer CSIs to include in a CSI report. For example, 1404 may be performed by storage component 1646. For instance, referring to FIG. 13, at 1320, the UE 1302 may store in a CSI buffer the CSIs (e.g., M CSIs 1350 or M' CSIs 1352) to include in CSI report 1348. For example, referring to FIGS. 8 and 10, the UE may store in CSI buffer 800 the M CSIs 802, 804, 806, 808, and 810, or in CSI buffer 1000 the M' CSIs 1002, 1004, 1006, 1008, and 1010.

At 1406, the UE identifies a CSI report trigger event. For example, 1406 may be performed by CSI report component 1650. For instance, referring to FIG. 13, at 1322, the UE 1302 may identify a CSI report trigger event. For example, the CSI report trigger event may be a weak ACK, one or more NACKs, or a CSI indication in DCI. More details with respect to each example follow.

In various examples, the CSI report trigger event may comprise an acknowledgment of one of the data transmissions, the one of the data transmissions having a quality of LLRs below a quality threshold or a SNR associated with a BLER above a BLER threshold. For instance, referring to FIG. 13, the CSI report trigger event identified at 1322 may be a weak ACK (e.g., ACK 1340) in response to data transmission 1326, where data transmission 1326 includes LLR quality 1328 less than quality threshold 1330. For instance, if data transmission 1326 has a small number of LLRs with a positive or negative value, the UE may determine that there is a small number of unambiguous bit values (0 or 1) and thus that the quality of the LLRs of the transport block is below a quality threshold. For example, if data transmission 1326 has one million bits, the quality threshold is 900,000 bits (e.g., 900,000 bits should have positive or negative LLRs corresponding to unambiguous bit values 0 and 1, respectively), and only 800,000 bits have LLRs corresponding to unambiguous bit values, the quality of the LLRs (e.g., 800,000) may be below the quality threshold (e.g., 900,000). Alternatively, the CSI report trigger event identified at 1322 may be a weak ACK (e.g., ACK 1340) in response to data transmission 1326, where data transmission 1326 includes SINR 1332 associated with BLER 1334 greater than BLER threshold 1336. For instance, if the observed SNR of data transmission 1326 at the UE (e.g., measured based on RSRP) is less than a nominal SNR due to poor channel conditions, the observed SNR may correspond to a higher BLER than a target BLER (e.g., 20% BLER or some other number larger than 10%). For example, referring to FIG. 6, the data transmission 1326 may include observed SINR 612 associated with observed BLER 616, where the observed BLER is higher than the target BLER 614. In either example, the acknowledgment may be indicated in a first-stage UCI and the CSI report may be sent in a second-stage UCI. For instance, referring to FIG. 13, the ACK 1340 may be indicated in first-stage UCI 1358 as a weak-ACK using weak ACK indicator 1344, and the CSI report 1348 may be sent to the base station 1304 in second-stage UCI 1360. For example, referring to FIG. 9, the ACK may be included in first stage UCI 902 and the CSI report may be included in second stage UCI 904.

In one example, the CSI report trigger event may comprise X non-acknowledgments in response to L data transmissions of the plurality of data transmissions, where $1 \leq X \leq L$. For instance, referring to FIG. 13, the CSI report trigger event identified at 1322 may be X NACKs (e.g., NACK 1342) within L data transmissions (e.g., data transmissions 1318, 1326). As an example, if the UE receives 5 PDSCH transmissions (L=5) and responds NACK to three of the transmissions (X=3), the most recent NACK may result in the CSI report trigger event.

In one example, the CSI report trigger event may comprise an indication in DCI. For instance, referring to FIG. 13, the CSI report trigger event identified at 1322 may be a CSI indication in DCI (e.g., DCI 1324). For example, the base station 1304 may configure a parameter in DCI 1324 indicating whether the CSI report trigger event has occurred (e.g., a flag or bit which the base station may set as the event trigger).

At 1408, the UE may determine to include, in the CSI report, M' CSIs of M CSIs for a latest N obtained data transmissions, where a value of M is in a CSI report configuration, the CSI report includes the M' CSIs, and $M' < M \leq N$. For example, 1408 may be performed by determination component 1644. For instance, referring to FIG. 13, at 1338, the UE may determine to include, in CSI report 1348, M' CSIs 1352 of M CSIs 1350 for a latest N obtained data transmissions (e.g., data transmissions 1318, 1326). For example, further referring to FIG. 10, the UE may select M' CSI 1002, 1004, 1006, 1008, 1010 stored in CSI buffer 1000, out of M configured CSI in CSI report configuration 1310, to send in CSI report 1348 in response to the CSI report trigger event identified at 1322. Thus M'<M, which value M in turn may be configured based on UE capability (e.g., a number N of CSI the UE may measure from recent obtained data transmissions), such that $M \leq N$. Thus, $M' < M \leq N$. For example, the UE may determine to send in a single CSI report the latest M' CSI measured from N most recently obtained PDSCH transmissions, where $M' < M \leq N$. For instance, if the base station configures the UE to report up to a maximum of four CSI following a CSI report trigger event (M=4), based on a UE capability of N=4, the UE may select to measure, store, and report a smaller number of CSI (e.g. M'=3 or less) and accordingly provide the most recent three or less stored CSI in the CSI buffer accordingly. In one example, the value of M' may be indicated in a first-stage UCI and the CSI report may be sent in a second-stage UCI. For instance, referring to FIG. 13, the value of M' 1346 may be indicated in first-stage UCI 1358, and the CSI report 1348 may be sent to the base station 1304 in second-stage UCI 1360. For example, referring to FIG. 11, the value of M' may be included in first stage UCI 1102 and the CSI report may be included in second stage UCI 1104.

At 1410, the UE sends the CSI report including the CSI for each of the data transmissions in response to the CSI report trigger event. For example, 1410 may be performed by CSI report component 1650. For instance, referring to FIG. 13, the UE 1302 may transmit CSI report 1348 including the M CSIs or M' CSIs for data transmissions 1318, 1326 (one CSI for each data transmission) in response to the CSI report trigger event identified at 1322.

In one example, the CSIs included in the CSI report may comprise M CSIs for a latest N obtained data transmissions, and where a value of M is in a CSI report configuration, N is based on UE capability, and M≤N. For instance, referring to FIG. 13, the CSI report 1348 may include M CSIs 1350 for a latest N obtained data transmissions (e.g., data transmissions 1318, 1326). For example, further referring to FIG. 8, the UE may determine to include M CSIs 802, 804, 806, 808, 810 stored in CSI buffer 800 in CSI report 1348 in response to the CSI report trigger event identified at 1322. Moreover, the value of M may be configured (e.g., in CSI report configuration 1310) based on UE capability (e.g., a number N of CSI the UE may store in its CSI buffer), such that M≤N. For example, if the UE 1302 provides capability information message 1306 to the base station 1304 indicating that the UE is capable of storing at most 10 prior CSIs at a time (N=10), the base station may configure the UE in CSI report configuration 1310 to report up to 10 prior CSIs (M≤10) following the CSI report trigger event.

In one example, the CSIs included in the CSI report may be indicated in a bitmap from the base station. For instance, referring to FIG. 13, the base station 1304 may transmit bitmap 1314 indicating which CSIs of the M CSIs 1350 the UE 1302 is to include in CSI report 1348. For instance, further referring to FIG. 8, the base station may provide bitmap 1314 having a length of M bits, with each bit corresponding to one of the M CSI 802, 804, 806, 808, 810 stored in the CSI buffer 800, and the base station may indicate through the bitmap which CSI the UE is to report based on the value of the corresponding bit (e.g., '1' to report and '0' not to report, or vice-versa). For example, if the base station configures the UE to report 4 CSI (M=4) according to the bitmap '1001', the UE may only report the oldest and newest CSI while refraining from reporting the second oldest and second newest CSI.

In one example, the CSIs included in the CSI report may comprise first CSI for each of the data transmissions triggering a non-acknowledgment, and second CSI for each of the data transmissions triggering an acknowledgment, where each of the acknowledgments is prior to each of the non-acknowledgments. For instance, referring to FIG. 13, the M CSIs 1350 (or M' CSIs 1352) included in CSI report 1348 may include first CSI 1354 for data transmissions 1318, 1326 resulting in NACK and second CSI 1356 for data transmissions 1318, 1326 resulting in ACKs. The UE may send these ACKs to the base station prior to the NACKs. For example, referring to FIG. 7, the UE may receive and successfully decode first downlink data 702 on PDSCH and second downlink data 704 on PDSCH, and accordingly respond with an ACK 706 to the base station for the first downlink data and second downlink data. In contrast, the UE may fail to decode third downlink data 708 on PDSCH (e.g., due to change in channel condition), and accordingly respond with a NACK 710 to the base station. As a result of the NACK (the CSI report trigger event in this example), the UE may report the CSI stored in the CSI buffer based on the configured value M. For example, if M=3, the UE may report the stored CSI for the first downlink data 702, second downlink data 704, and third downlink data 708. The CSI for third downlink data 708 (which resulted in NACK) may thus correspond to first CSI 1354, and the CSI for the first downlink data 702 and second downlink data 704 (which each resulted in ACK prior to third downlink data 708) may thus correspond to second CSI 1356.

In one example, each of the CSIs may include an expiration time following the CSI report trigger event. The expiration time for each of the CSIs may be in a RRC configuration or a MAC-CE. For instance, referring to FIG. 13, the base station 1304 may provide CSI expiration time configuration 1312 to UE 1302 indicating a configured expiration time for each of the M CSI 1350 (or M' CSI 1352). The expiration time may indicate the time window during which the CSI may be of value to the base station, and the UE may refrain from reporting expired CSI in CSI report 1348 at the time a CSI report trigger event occurs. For example, in response to the CSI report trigger event, the UE may compare the amount of time elapsed on the timer for measured CSI with the configured expiration time. If the UE determines that the amount of time elapsed does not exceed the configured expiration time, the UE may conclude that the measured CSI has not yet expired, and therefore the UE may report the measured CSI in response to the CSI report trigger event. The UE may similarly check whether other measured CSI has expired at the time the UE is triggered to provide the CSI report. Thus, all CSI included in the CSI report may have an expiration time following the CSI report trigger event identified at 1322.

In one example, the CSI report may exclude CSIs sent in a previous CSI report. For instance, referring to FIG. 13, the CSI report 1348 may include M CSIs 1350 (or M' CSIs 1352) that were not sent in a previous CSI report to base station 1304. For example, further referring to FIGS. 8 and 10, if the UE reports all the CSI stored in the CSI buffer 800 or 1000 in response to the CSI report trigger event identified at 1322, the UE may discard all the CSI to empty the buffer and proceed to measure and store new CSI for subsequent PDSCH transmissions following the CSI report trigger event. Alternatively, if the UE reports a portion of the CSI stored in the CSI buffer 800 or 1000 (e.g., in response to bitmap 1314), the UE may discard only the reported CSI from the buffer and continue to store new CSI in the opened buffer locations accordingly. Thus, the UE may exclude previously shared CSI from its reporting to the base station.

In one example, the CSI report may further include an average CQI for the data transmissions. For instance, referring to FIG. 13, the CSI report 1348 may include an averaged CQI using IIR filters, which the UE 1302 may report given a sufficient number of bits in the CSI report payload. For example, the UE may apply IIR filtering to an average CQI computed over prior PDSCH transmissions (e.g., data transmissions 1318, 1326) and report the average CQI in addition to the instantaneous CQI for each prior PDSCH transmission in the CSI report 1348. For example, referring to FIG. 12, the UE may compute and store in CSI buffer 1200 an average CQI 1202 that the UE calculates from the M (or M') stored CSI and applies IIR filtering, and the UE may report this average CQI in the CSI report to the base station.

Finally at 1412, the UE may discard from the CSI buffer expired CSIs or CSIs sent in a previous CSI report. For example, 1412 may be performed by discard component 1648. For instance, referring to FIG. 13, at 1362, the UE may discard from its CSI buffer any of the M CSIs 1350 or M' CSIs 1352 which have expired or have been sent in a previous CSI report. For example, further referring to FIG. 8 or 10, after the UE reports or shares one or more of the M CSIs 802, 804, 806, 808, 810 stored in CSI buffer 800 or one or more of the M' CSIs 1002, 1004, 1006, 1008, 1010 stored in CSI buffer 1000 with the base station, or if one or more of these CSIs expire before being shared, the UE may discard those CSIs from the CSI buffer, and the UE may continue to store new CSI for other PDSCH transmissions in the opened buffer locations. For instance, if the UE reports all the CSI stored in the CSI buffer 800 or 1000 in response to the CSI report trigger event, the UE may discard all the CSI to empty the buffer and proceed to measure and store new CSI for subsequent PDSCH transmissions following the CSI report trigger event. Alternatively, if any un-reported CSI has expired before it is reported, the UE may discard the expired CSI from the buffer and proceed to measure and store new CSI for subsequent PDSCH transmissions in the opened buffer locations. Thus, the UE may store and report un-expired and un-shared CSI with the base station.

Figure 15:
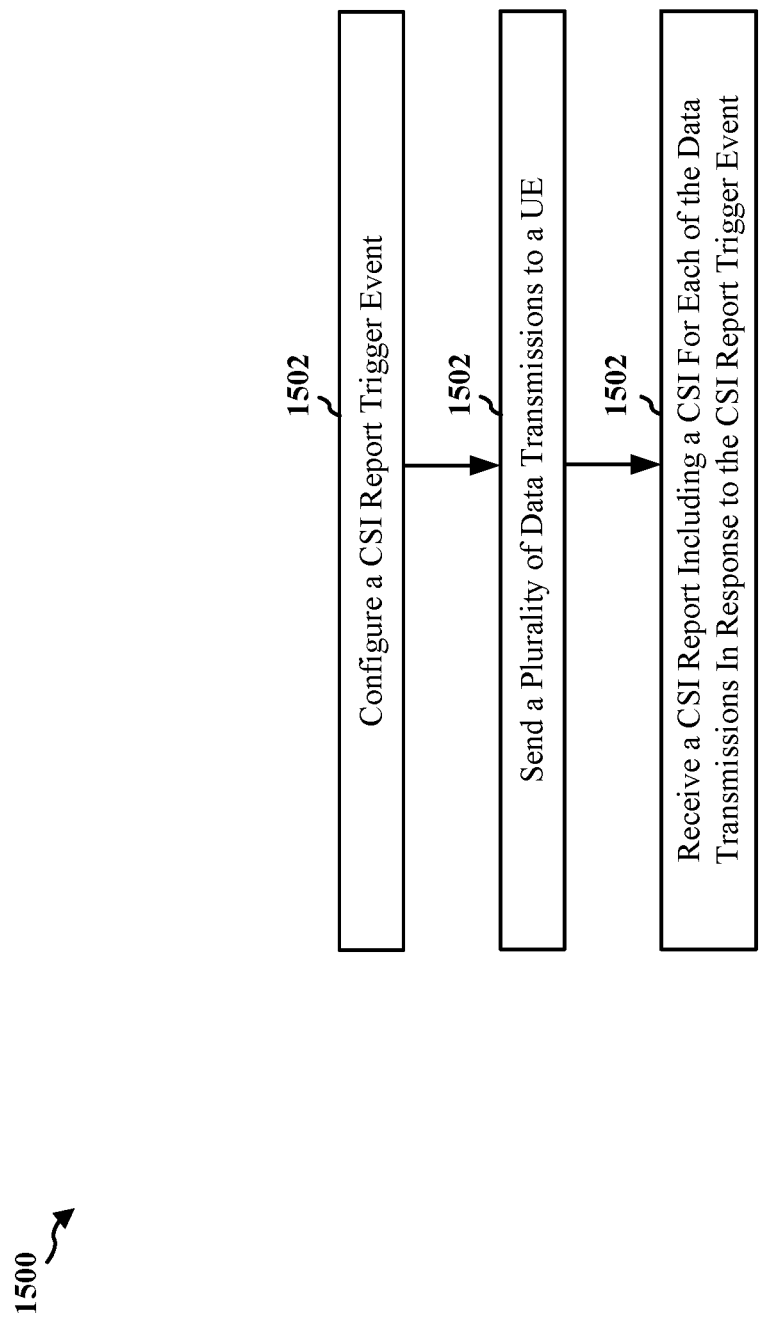
FIG. 15 is a flowchart of a method of wireless communication at a base station.

FIG. 15 is a flowchart 1500 of a method of wireless communication. The method may be performed by a base station (e.g., the base station 102/180, 1304; the apparatus 1702. Optional aspects are illustrated in dashed lines. The method allows a base station to configure a UE to accumulate CSI over time for multiple downlink data transmissions in a CSI buffer and to receive the accumulated CSI from the UE in a single CSI report in response to a CSI report trigger event, thereby allowing the base station to correct outer loop behavior and improve transmission reliability in subsequent downlink communications.

At 1502, the base station configures a CSI report trigger event. For example, 1502 may be performed by event component. For instance, referring to FIG. 13, at 1308, the base station 1304 may configure a CSI report trigger event in trigger event configuration 1309. For example, the CSI report trigger event may be a weak ACK, one or more NACKs, or a CSI indication in DCI. More details with respect to each example follow.

In various examples, the CSI report trigger event may comprise an acknowledgment of one of the data transmissions, the one of the data transmissions having a quality of LLRs below a quality threshold or a SNR associated with a BLER above a BLER threshold. For instance, referring to FIG. 13, the CSI report trigger event configured at 1308 may be a weak ACK (e.g., ACK 1340) in response to data transmission 1326, where data transmission 1326 includes LLR quality 1328 less than quality threshold 1330. Alternatively, the CSI report trigger event configured at 1308 may be a weak ACK (e.g., ACK 1340) in response to data transmission 1326, where data transmission 1326 includes SINR 1332 associated with BLER 1334 greater than BLER threshold 1336.

In one example, the CSI report trigger event may comprise X non-acknowledgments in response to L data transmissions of the plurality of data transmissions, where 1≤X≤L. For instance, referring to FIG. 13, the CSI report trigger event configured at 1308 may be X NACKs (e.g., NACK 1342) within L data transmissions (e.g., data transmissions 1318, 1326). As an example, if the UE receives 5 PDSCH transmissions (L=5) and responds NACK to three of the transmissions (X=3), the most recent NACK may result in the CSI report trigger event.

In one example, the CSI report trigger event may comprise an indication in DCI. For instance, referring to FIG. 13, the CSI report trigger event configured at 1308 may be a CSI indication in DCI (e.g., DCI 1324). For example, the base station 1304 may configure a parameter in DCI 1324 indicating whether the CSI report trigger event has occurred (e.g., a flag or bit which the base station may set as the event trigger).

At 1504, the base station sends a plurality of data transmissions to a UE. For example, 1504 may be performed by data transmission component 1742. For instance, referring to FIG. 13, the base station 1304 may send data transmissions 1318, 1326 to the UE 1302. For example, referring to FIG. 7, the base station may transmit downlink data 702, 704, 708 on PDSCH, with each of the downlink data corresponding to one of the data transmissions.

Finally, at 1506, the base station receives a CSI report including a CSI for each of the data transmissions in response to the CSI report trigger event. For example, 1506 may be performed by CSI report component 1744. For instance, referring to FIG. 13, the base station 1304 may receive CSI report 1348 including the M CSIs or M' CSIs for data transmissions 1318, 1326 (one CSI for each data transmission) in response to the CSI report trigger event configured at 1308.

In one example, the CSIs included in the CSI report may comprise M CSIs for a latest N sent data transmissions, where a value of M is in a CSI report configuration, N is based on UE capability, and M≤N. For instance, referring to FIG. 13, the CSI report 1348 may include M CSIs 1350 for a latest N obtained data transmissions (e.g., data transmissions 1318, 1326). For example, further referring to FIG. 8, the UE may determine to include M CSIs 802, 804, 806, 808, 810 stored in CSI buffer 800 in CSI report 1348 in response to the CSI report trigger event configured at 1308. Moreover, the value of M may be configured (e.g., in CSI report configuration 1310) based on UE capability (e.g., a number N of CSI the UE may store in its CSI buffer), such that M≤N. For example, if the UE 1302 provides capability information message 1306 to the base station 1304 indicating that the UE is capable of storing at most 10 prior CSIs at a time (N=10), the base station may configure the UE in CSI report configuration 1310 to report up to 10 prior CSIs (M≤10) following the CSI report trigger event.

In one example, the CSIs included in the CSI report may be indicated in a bitmap. For instance, referring to FIG. 13, the base station 1304 may transmit bitmap 1314 indicating which CSIs of the M CSIs 1350 the UE 1302 is to include in CSI report 1348. For instance, further referring to FIG. 8, the base station may provide bitmap 1314 having a length of M bits, with each bit corresponding to one of the M CSI 802, 804, 806, 808, 810 stored in the CSI buffer 800, and the base station may indicate through the bitmap which CSI the UE is to report based on the value of the corresponding bit (e.g., '1' to report and '0' not to report, or vice-versa). For example, if the base station configures the UE to report 4 CSI (M=4) according to the bitmap '1001', the UE may only report the oldest and newest CSI while refraining from reporting the second oldest and second newest CSI.

In one example, the CSIs included in the CSI report may comprise first CSI for each of the data transmissions triggering a non-acknowledgment, and second CSI for each of the data transmissions triggering an acknowledgment, where each of the acknowledgments is prior to each of the non-acknowledgments. For instance, referring to FIG. 13, the M CSIs 1350 (or M' CSIs 1352) included in CSI report 1348 may include first CSI 1354 for data transmissions 1318, 1326 resulting in NACK and second CSI 1356 for data transmissions 1318, 1326 resulting in ACKs. The UE may send these ACKs to the base station prior to the NACKs. For example, referring to FIG. 7, the UE may receive and successfully decode first downlink data 702 on PDSCH and second downlink data 704 on PDSCH, and accordingly respond with an ACK 706 to the base station for the first downlink data and second downlink data. In contrast, the UE may fail to decode third downlink data 708 on PDSCH (e.g., due to change in channel condition), and accordingly respond with a NACK 710 to the base station. As a result of the NACK (the CSI report trigger event in this example), the UE may report the CSI stored in the CSI buffer based on the configured value M. For example, if M=3, the UE may report the stored CSI for the first downlink data 702, second downlink data 704, and third downlink data 708. The CSI for third downlink data 708 (which resulted in NACK) may thus correspond to first CSI 1354, and the CSI for the first downlink data 702 and second downlink data 704 (which each resulted in ACK prior to third downlink data 708) may thus correspond to second CSI 1356.

In one example, the CSIs included in the CSI report may comprise M' CSIs of M CSIs for a latest N sent data transmissions, where a value of M is in a CSI report configuration, the CSI report includes the M' CSIs, and M'<M≤N. For instance, referring to FIG. 13, at 1338, the UE may determine to include, in CSI report 1348, M' CSIs 1352 of M CSIs 1350 for a latest N obtained data transmissions (e.g., data transmissions 1318, 1326). For example, further referring to FIG. 10, the UE may select M' CSI 1002, 1004, 1006, 1008, 1010 stored in CSI buffer 1000, out of M configured CSI in CSI report configuration 1310, to send in CSI report 1348 in response to the CSI report trigger event configured at 1308. Thus M'<M, which value Min turn may be configured based on UE capability (e.g., a number N of CSI the UE may measure from recent obtained data transmissions), such that M≤N. Thus, M'<M≤N. For example, the UE may determine to send in a single CSI report the latest M' CSI measured from N most recently obtained PDSCH transmissions, where M'<M≤N. For instance, if the base station configures the UE to report up to a maximum of four CSI following a CSI report trigger event (M=4), based on a UE capability of N=4, the UE may select to measure, store, and report a smaller number of CSI (e.g. M'=3 or less) and accordingly provide the most recent three or less stored CSI in the CSI buffer accordingly.

Figure 16:
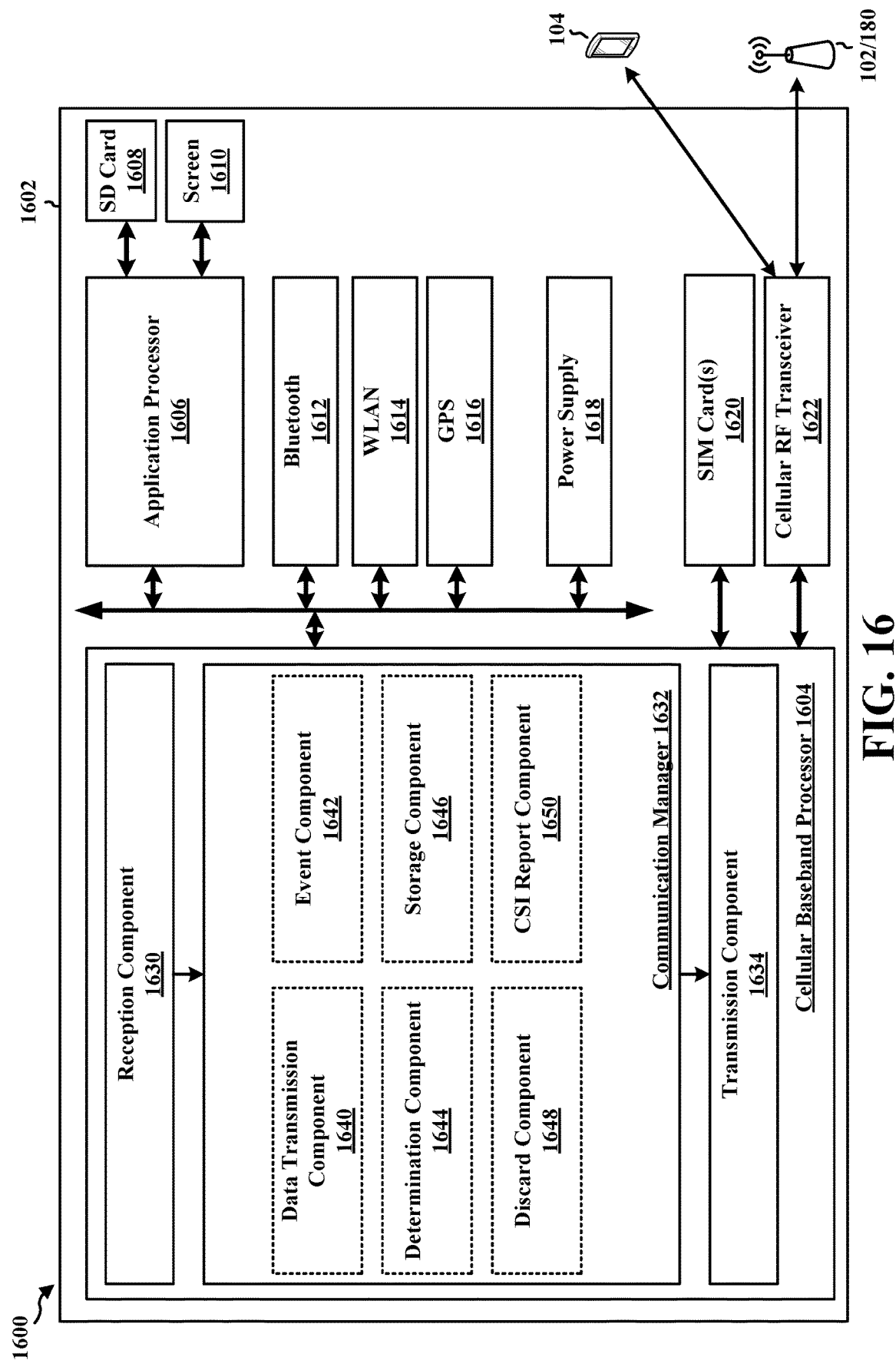
FIG. 16 is a diagram illustrating an example of a hardware implementation for an example UE apparatus.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the aforediscussed additional modules of the apparatus 1602.

The communication manager 1632 includes a data transmission component 1640 that is configured to receive a plurality of data transmissions from a base station, e.g., as described in connection with 1402. The communication manager 1632 further includes an event component 1642 that is configured to identify a CSI report trigger event, e.g., as described in connection with 1406. The communication manager 1632 further includes a determination component 1644 that is configured to determine to include in a CSI report M' CSIs of M CSIs for a latest N obtained data transmissions, where a value of M is in a CSI report configuration, the CSI report includes the M' CSIs, and M'<M≤N, e.g., as described in connection with 1408. The communication manager 1632 further includes a storage component 1646 that is configured to store in a CSI buffer the CSIs to include in the CSI report, e.g., as described in connection with 1404. The communication manager 1632 further includes a discard component 1648 that is configured to discard from the CSI buffer expired CSIs or CSIs sent in a previous CSI report, e.g., as described in connection with 1412. The communication manager 1632 further includes a CSI report component 1650 that is configured to send a CSI report including a CSI for each of the data transmissions in response to the CSI report trigger event, e.g., as described in connection with 1410.

The apparatus may include additional components that perform each of the blocks of the algorithm in the aforementioned flowcharts of FIGS. 13 and 14. As such, each block in the aforementioned flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for receiving a plurality of data transmissions from a base station; means for identifying a channel state information (CSI) report trigger event; and means for sending a CSI report including a CSI for each of the data transmissions in response to the CSI report trigger event.

In one configuration, the apparatus 1602, and in particular the cellular baseband processor 1604, may include means for determining to include in the CSI report M' CSIs of M CSIs for a latest N obtained data transmissions, where a value of M is in a CSI report configuration, the CSI report includes the M' CSIs, and M'<M≤N.

In one configuration, the apparatus 1602, and in particular the cellular baseband processor 1604, may include means for storing in a CSI buffer the CSIs to include in the CSI report; and means for discarding from the CSI buffer expired CSIs or CSIs sent in a previous CSI report.

The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
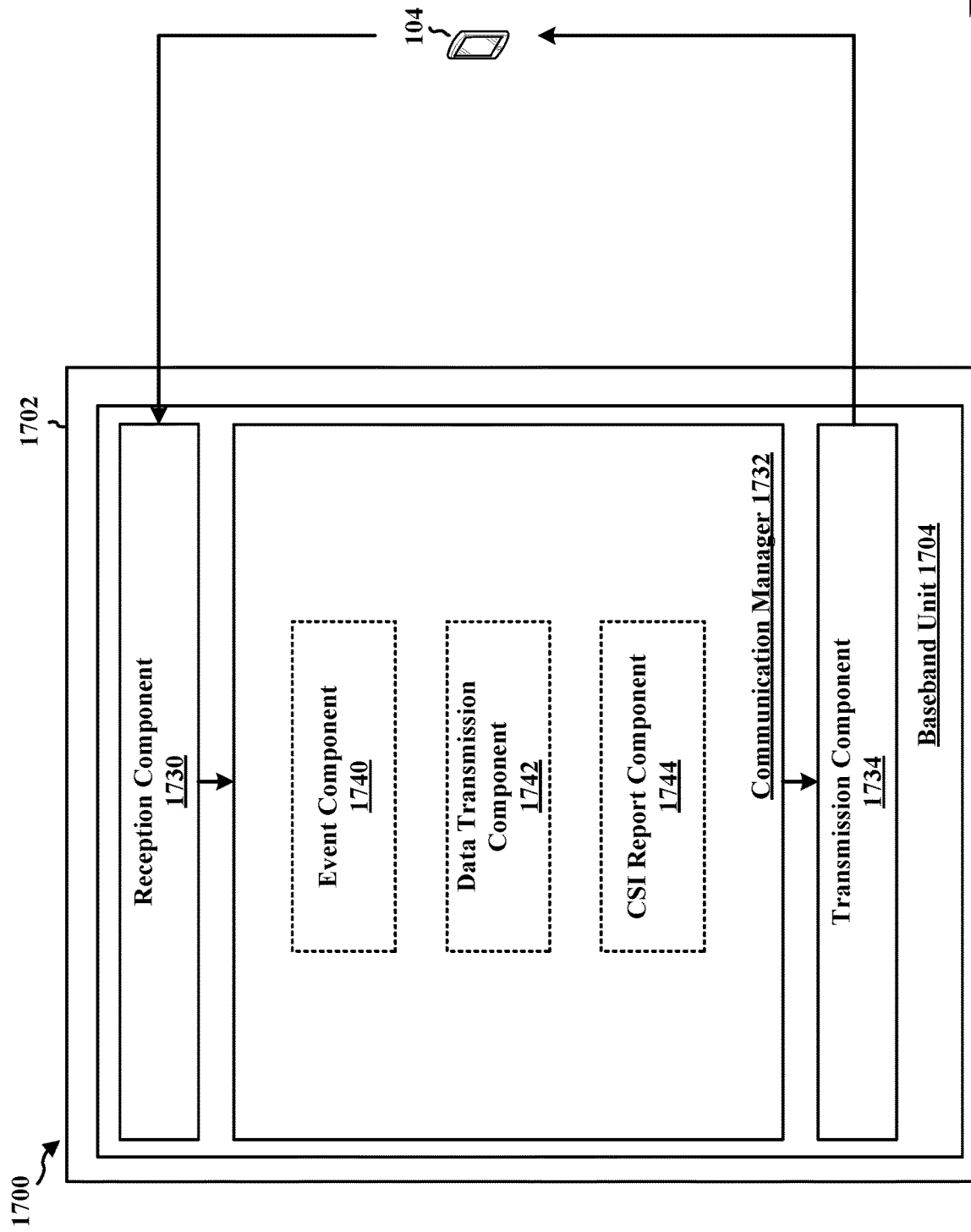
FIG. 17 is a diagram illustrating another example of a hardware implementation for another example base station apparatus.

FIG. 17 is a diagram 1700 illustrating an example of a hardware implementation for an apparatus 1702. The apparatus 1702 is a BS and includes a baseband unit 1704. The baseband unit 1704 may communicate through a cellular RF transceiver with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the BS 310 and may include the memory 376 and/or at least one of the TX processor 316, the RX processor 370, and the controller/processor 375.

The communication manager 1732 includes an event component 1740 that is configured to configure a CSI report trigger event, e.g., as described in connection with 1502. The communication manager 1732 further includes a data transmission component 1742 that is configured to send a plurality of data transmissions to a UE, e.g., as described in connection with 1504. The communication manager 1732 further includes a CSI report component 1744 that is configured to receive a CSI report including a CSI for each of the data transmissions in response to the CSI report trigger event, e.g., as described in connection with 1506.

The apparatus may include additional components that perform each of the blocks of the algorithm in the aforementioned flowcharts of FIGS. 13 and 15. As such, each block in the aforementioned flowcharts of FIGS. 13 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband unit 1704, includes means for sending a plurality of data transmissions to a user equipment (UE); means for configuring a channel state information (CSI) report trigger event; and means for receiving a CSI report including a CSI for each of the data transmissions in response to the CSI report trigger event.

The aforementioned means may be one or more of the aforementioned components of the apparatus 1702 configured to perform the functions recited by the aforementioned means. As described supra, the apparatus 1702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, aspects of the present disclosure allow a UE to accumulate CSI over time for multiple downlink data transmissions in a CSI buffer and to transfer the accumulated CSI to the base station in a single CSI report in response to a CSI report trigger event, thereby improving efficiency in CSI reporting. Similarly, aspects of the present disclosure allow a base station to configure a UE to accumulate CSI over time for multiple downlink data transmissions in a CSI buffer and to receive the accumulated CSI from the UE in a single CSI report in response to a CSI report trigger event, thereby allowing the base station to correct outer loop behavior and improve transmission reliability in subsequent downlink communications.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device,"

and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving a plurality of data transmissions from a base station; identifying a channel state information (CSI) report trigger event; and sending a CSI report including a CSI for each of the data transmissions in response to the CSI report trigger event.

Example 2 is the method of Example 1, where the CSI report trigger event comprises an acknowledgment of one of the data transmissions, the one of the data transmissions having: a quality of log-likelihood ratios (LLRs) below a quality threshold; or a signal-to-noise ratio (SNR) associated with a block error rate (BLER) above a BLER threshold.

Example 3 is the method of Example 2, where the acknowledgment is indicated in a first-stage uplink control information (UCI) and the CSI report is sent in a second-stage UCI.

Example 4 is the method of Example 1, where the CSI report trigger event comprises X non-acknowledgments in response to L data transmissions of the plurality of data transmissions, wherein $1 \leq X \leq L$.

Example 5 is the method of any of Examples 1 to 4, where the CSI report trigger event comprises an indication in downlink control information (DCI).

Example 6 is the method of any of Examples 1 to 5, where the CSIs included in the CSI report comprise M CSIs for a latest N obtained data transmissions, and where a value of M is in a CSI report configuration, N is based on UE capability, and $M \leq N$.

Example 7 is the method of any of Examples 1 to 6, where the CSIs included in the CSI report are indicated in a bitmap from the base station.

Example 8 is the method of any of Examples 1, 4 to 7, where the CSIs included in the CSI report comprise: first CSI for each of the data transmissions triggering a non-acknowledgment, and second CSI for each of the data transmissions triggering an acknowledgment, where each of the acknowledgments is prior to each of the non-acknowledgments.

Example 9 is the method of any of Examples 1 to 5, further comprising: determining to include in the CSI report M' CSIs of M CSIs for a latest N obtained data transmissions, where a value of M is in a CSI report configuration, the CSI report includes the M' CSIs, and $M'<M \leq N$.

Example 10 is the method of Example 9, where a value of M' is indicated in a first-stage uplink control information (UCI) and the CSI report is sent in a second-stage UCI.

Example 11 is the method of any of Examples 1 to 10, where each of the CSIs include an expiration time following the CSI report trigger event.

Example 12 is the method of Example 11, where an expiration time for each of the CSIs is in a radio resource control (RRC) configuration or a medium access control (MAC) control element (MAC-CE).

Example 13 is the method of any of Examples 1 to 12, where the CSI report excludes CSIs sent in a previous CSI report.

Example 14 is the method of any of Examples 1 to 13, further comprising: storing in a CSI buffer the CSIs to include in the CSI report; and discarding from the CSI buffer expired CSIs or CSIs sent in a previous CSI report.

Example 15 is the method of any of Examples 1 to 14, where the CSI report further includes an average channel quality indicator (CQI) for the data transmissions.

Example 16 is an apparatus for wireless communication, comprising: a processor; memory coupled with the processor; and instructions stored in the memory and operable, when executed by the processor, to cause the apparatus to: receive a plurality of data transmissions from a base station; identify a channel state information (CSI) report trigger event; and send a CSI report including a CSI for each of the data transmissions in response to the CSI report trigger event.

Example 17 is the apparatus of Example 16, where the CSIs included in the CSI report comprise M CSIs for a latest N obtained data transmissions, and where a value of M is in a CSI report configuration, N is based on UE capability, and $M \leq N$.

Example 18 is the apparatus of Examples 16 or 17, where the CSIs included in the CSI report are indicated in a bitmap from the base station.

Example 19 is the apparatus of any of Examples 16 to 18, where the CSIs included in the CSI report comprise: first CSI for each of the data transmissions triggering a non-acknowledgment, and second CSI for each of the data transmissions triggering an acknowledgment, where each of the acknowledgments is prior to each of the non-acknowledgments.

Example 20 is the apparatus of Example 16, where the instructions, when executed by the processor, further cause the apparatus to: determine to include in the CSI report M' CSIs of M CSIs for a latest N obtained data transmissions, where a value of M is in a CSI report configuration, the CSI report includes the M' CSIs, and $M'<M \leq N$.

Example 21 is the apparatus of any of Examples 16 to 20, where the instructions, when executed by the processor, further cause the apparatus to: store in a CSI buffer the CSIs to include in the CSI report; and discard from the CSI buffer expired CSIs or CSIs sent in a previous CSI report.

Example 22 is a method of wireless communication at a base station, comprising: sending a plurality of data transmissions to a user equipment (UE); configuring a channel state information (CSI) report trigger event; and receiving a CSI report including a CSI for each of the data transmissions in response to the CSI report trigger event.

Example 23 is the method of Example 22, where the CSIs included in the CSI report comprise M CSIs for a latest N sent data transmissions, and where a value of M is in a CSI report configuration, N is based on UE capability, and $M \leq N$.

Example 24 is the method of Examples 22 or 23, where the CSIs included in the CSI report are indicated in a bitmap.

Example 25 is the method of any of Examples 22 to 24, where the CSIs included in the CSI report comprise: first CSI for each of the data transmissions triggering a non-acknowledgment, and second CSI for each of the data transmissions triggering an acknowledgment, where each of the acknowledgments is prior to each of the non-acknowledgments.

Example 26 is the method of Example 22, where the CSIs included in the CSI report comprise M' CSIs of M CSIs for a latest N sent data transmissions, where a value of M is in a CSI report configuration, the CSI report includes the M' CSIs, and $M'<M \leq N$.

Example 27 is an apparatus for wireless communication, comprising: a processor; memory coupled with the processor; and instructions stored in the memory and operable, when executed by the processor, to cause the apparatus to: send a plurality of data transmissions to a user equipment (UE); configure a channel state information (CSI) report trigger event; and receive a CSI report including a CSI for each of the data transmissions in response to the CSI report trigger event.

Example 28 is the apparatus of Example 27, where the CSIs included in the CSI report comprise M CSIs for a latest N sent data transmissions, and where a value of M is in a CSI report configuration, N is based on UE capability, and M≤N.

Example 29 is the apparatus of Examples 27 or 28, where the CSIs included in the CSI report are indicated in a bitmap.

Example 30 is the apparatus of Example 27, where the CSIs included in the CSI report comprise M' CSIs of M CSIs for a latest N sent data transmissions, where a value of M is in a CSI report configuration, the CSI report includes the M' CSIs, and M'<M≤N.

What is claimed is:

1. A method of wireless communication at a user equipment (UE), comprising:
   receiving a plurality of data transmissions from a base station;
   storing in a channel state information (CSI) buffer, channel state information to include in a CSI report;
   discarding from the CSI buffer expired CSIs or CSIs send in a previous CSI report;
   identifying a channel state information (CSI) report trigger event; and
   sending the CSI report comprising a plurality of CSIs, the plurality of CSIs including a CSI for each of the plurality of data transmissions in response to the CSI report trigger event.

2. The method of claim 1, wherein the CSI report trigger event comprises an acknowledgment of one of the plurality of data transmissions, the one of the plurality of data transmissions having:
   a quality of log-likelihood ratios (LLRs) below a quality threshold; or
   a signal-to-noise ratio (SNR) associated with a block error rate (BLER) above a BLER threshold.

3. The method of claim 2, wherein the acknowledgment is indicated in a first-stage uplink control information (UCI) and the CSI report is sent in a second-stage UCI.

4. The method of claim 1, wherein the CSI report trigger event comprises X non-acknowledgments in response to L data transmissions of the plurality of data transmissions, wherein 1≤X≤L.

5. The method of claim 1, wherein the CSI report trigger event comprises an indication in downlink control information (DCI).

6. The method of claim 1,
   wherein the CSIs included in the CSI report comprise MCSIs for a latest N obtained data transmissions, and
   wherein a value of M is in a CSI report configuration, N is based on UE capability, and M≤N.

7. The method of claim 1, wherein the CSIs included in the CSI report are indicated in a bitmap from the base station.

8. The method of claim 1, wherein the CSIs included in the CSI report comprise:
   first CSI for each of the data transmissions triggering a non-acknowledgment, and
   second CSI for each of the data transmissions triggering an acknowledgment,
   wherein each of the acknowledgments is prior to each of the non-acknowledgments.

9. The method of claim 1, further comprising:
   determining to include, in the CSI report, M' CSIs of M CSIs for a latest N obtained data transmissions,
   wherein a value of M is in a CSI report configuration, the CSI report includes the M' CSIs, and M'<M≤N.

10. The method of claim 9, wherein a value of M' is indicated in a first-stage uplink control information (UCI) and the CSI report is sent in a second-stage UCI.

11. The method of claim 1, wherein each of the CSIs include an expiration time following the CSI report trigger event.

12. The method of claim 11, wherein the expiration time for each of the CSIs is in a radio resource control (RRC) configuration or a medium access control (MAC) control element (MAC-CE).

13. The method of claim 1, wherein the CSI report excludes CSIs sent in a previous CSI report.

14. The method of claim 1, wherein the CSI report further includes an average channel quality indicator (CQI) for the data transmissions.

15. An apparatus for wireless communication, comprising:
   a processor;
   memory coupled with the processor; and
   instructions stored in the memory and operable, when executed by the processor, to cause the apparatus to:
      receive a plurality of data transmissions from a base station;
      store in a channel state information (CSI) buffer CSIs to include in a CSI report;
      discard from the CSI buffer expired CSIs or CSIs sent in a previous CSI report;
      identify a channel state information (CSI) report trigger event; and
      send the CSI report comprising a plurality of CSIs, the plurality of CSIs including a CSI for each of the plurality of data transmissions in response to the CSI report trigger event.

16. The apparatus of claim 15,
   wherein the CSIs included in the CSI report comprise M CSIs for a latest N obtained data transmissions, and
   wherein a value of M is in a CSI report configuration, N is based on UE capability, and M≤N.

17. The apparatus of claim 15, wherein the CSIs included in the CSI report are indicated in a bitmap from the base station.

18. The apparatus of claim 15, wherein the CSIs included in the CSI report comprise:
   first CSI for each of the data transmissions triggering a non-acknowledgment, and
   second CSI for each of the data transmissions triggering an acknowledgment,
   wherein each of the acknowledgments is prior to each of the non-acknowledgments.

19. The apparatus of claim 15, wherein the instructions, when executed by the processor, further cause the apparatus to:
   determine to include, in the CSI report, M' CSIs of M CSIs for a latest N obtained data transmissions,
   wherein a value of M is in a CSI report configuration, the CSI report includes the M' CSIs, and M'<M≤N.

20. A method of wireless communication at a base station, comprising:
   sending a plurality of data transmissions to a user equipment (UE);
   configuring a channel state information (CSI) report trigger event; and
   receiving a CSI report comprising a plurality of CSIs, the plurality of CSIs including a CSI for each of the plurality of data transmissions in response to the CSI report trigger event wherein the CSIs included in the CSI report comprise M CSIs for a latest N sent data transmissions, and wherein a value of M is in a CSI report configuration, N is based on UE capability, and M N.

21. The method of claim 20, wherein the CSIs included in the CSI report are indicated in a bitmap.

22. The method of claim 20, wherein the CSIs included in the CSI report comprise:
   first CSI for each of the data transmissions triggering a non-acknowledgment, and
   second CSI for each of the data transmissions triggering an acknowledgment,
   wherein each of the acknowledgments is prior to each of the non-acknowledgments.

23. The method of claim 20,
   wherein the CSIs included in the CSI report comprise M' CSIs of M CSIs for a latest N sent data transmissions,
   wherein a value of M is in the CSI report configuration, the CSI report includes the M' CSIs, and $M'<M \leq N$.

24. An apparatus for wireless communication, comprising:
   a processor;
   memory coupled with the processor; and
   instructions stored in the memory and operable, when executed by the processor, to cause the apparatus to:
      send a plurality of data transmissions to a user equipment (UE);
      configure a channel state information (C SI) report trigger event; and
      receive a CSI report including a CSI for each of the plurality of data transmissions in response to the CSI report trigger event, wherein the CSIs included in the CSI report comprise M CSIs for a latest N sent data transmissions, and
   wherein a value of M is in a CSI report configuration, N is based on UE capability, and $M \leq N$.

25. The apparatus of claim 24, wherein the CSIs included in the CSI report are indicated in a bitmap.

26. The apparatus of claim 24,
   wherein the CSIs included in the CSI report comprise M' CSIs of M CSIs for a latest N sent data transmissions, and
   the CSI report includes the M' CSIs, and $M'<M \leq N$.

* * * * *